US 10,598,976 B2

(12) United States Patent
Jin et al.

(10) Patent No.: US 10,598,976 B2
(45) Date of Patent: Mar. 24, 2020

(54) LIQUID CRYSTAL DISPLAY DEVICE

(71) Applicant: Japan Display Inc., Tokyo (JP)

(72) Inventors: Lu Jin, Tokyo (JP); Shinichiro Oka, Tokyo (JP); Yosuke Hyodo, Tokyo (JP)

(73) Assignee: Japan Display Inc., Tokyo (JP)

( * ) Notice: Subject to any disclaimer, the term of this patent is extended or adjusted under 35 U.S.C. 154(b) by 179 days.

(21) Appl. No.: 15/722,247

(22) Filed: Oct. 2, 2017

(65) Prior Publication Data

US 2018/0113335 A1  Apr. 26, 2018

(30) Foreign Application Priority Data

Oct. 25, 2016 (JP) .................. 2016-208485

(51) Int. Cl.
| | |
|---|---|
| *G02F 1/1334* | (2006.01) |
| *G02F 1/1339* | (2006.01) |
| *G02F 1/1341* | (2006.01) |
| *G02F 1/13* | (2006.01) |
| *G02F 1/1333* | (2006.01) |

(52) U.S. Cl.
CPC .......... *G02F 1/1334* (2013.01); *G02F 1/1323* (2013.01); *G02F 1/1339* (2013.01); *G02F 1/1341* (2013.01); *G02F 1/13394* (2013.01); *G02F 1/133305* (2013.01); *G02F 2001/13396* (2013.01); *G02F 2001/13398* (2013.01)

(58) Field of Classification Search
CPC ............ G02F 2001/13396; G02F 2001/13398
See application file for complete search history.

(56) References Cited

U.S. PATENT DOCUMENTS

| 2014/0111746 A1* | 4/2014 | Kim .................. G02F 1/133377 349/106 |
| 2016/0231607 A1* | 8/2016 | Wu ........................ G02F 1/1339 |
| 2017/0351141 A1* | 12/2017 | Kubota ............. G02F 1/133305 |

FOREIGN PATENT DOCUMENTS

JP    2006-162825 A    6/2006

* cited by examiner

*Primary Examiner* — Alexander P Gross
(74) *Attorney, Agent, or Firm* — Michael Best & Friedrich LLP

(57) ABSTRACT

A liquid crystal display device includes a first substrate, a second substrate facing the first substrate, a liquid crystal layer between the first substrate and the second substrate, the liquid crystal layer being enclosed by a sealing member, a first protrusion in one of the first substrate and the second substrate in a region inner to the sealing member, the first protrusion protruding toward the other of the first substrate and the second substrate, and a resin component bonding the other of the first substrate and the second substrate and the first protrusion to each other.

14 Claims, 18 Drawing Sheets

LIQUID CRYSTAL DISPLAY DEVICE

CROSS REFERENCE TO RELATED APPLICATIONS

This application is based upon and claims the benefit of priority from the prior Japanese Patent Application No. 2016-208485 filed on Oct. 25, 2016, the entire contents of which are incorporated herein by reference.

FIELD

The present invention relates to a liquid crystal display device, and specifically, to a sealing structure for a liquid crystal layer in a liquid crystal display device.

BACKGROUND

A flexible display is expected to be used in a wide range from a mobile foldable display to a large screen display. A flexible display is strongly desired to be realized as a next-generation display that is lightweight and is easily accommodated. Especially, a liquid crystal display element is applicable to both of a transmission-type display system and a reflection-type display system, and thus has a possibility of being applied to a flexible display that provides superb visible recognizability in any of various illumination environments.

A liquid crystal display device may be curved or folded when being used for a certain use. When the liquid crystal display device is curved or folded, the thickness of a liquid crystal layer is changed due to a difference in the degree of deflection between a transistor array substrate and a counter substrate facing each other. In addition, the positional relationship between pixel electrodes in the array substrate and color filters in the counter substrate is changed (pixel defect occurs) due to a shift of the substrates in a planar direction of the substrates. There is a problem that the display quality of the liquid crystal display device is decreased due to these phenomena. In order to solve the problem, a technology of using a polymer to form a connection portion that bonds and secures the two substrates to each other. A technique used most commonly for forming the connection portion of the polymer is an ultraviolet patterning polymerization method.

Japanese Laid-Open Patent Publication No. 2006-162825 describes a basic mechanism of this technique. A mixed solution of a liquid crystal material and a monomer is exposed to ultraviolet light to form a pattern. As a result, the molecular weight and the form of the monomer are rapidly changed because of a photopolymerization reaction. The photopolymerization reaction changes the monomer into a polymer, and thus phase separation of the liquid crystal material and the monomer advances. Specifically, a polymerization reaction of the monomer, which is ultraviolet-polymerizable, is started when the monomer is irradiated with ultraviolet light. By the influence of the resultant concentration variance in the monomer, the monomer is condensed in a part exposed to the ultraviolet light and the liquid crystal material is condensed in a part not exposed to the ultraviolet light. This causes the phase separation. The condensed monomer is polymerized by being irradiated with the ultraviolet light, resulting in the formation of a polymer in the part exposed to the ultraviolet light.

According to the technique described in Japanese Laid-Open Patent Publication No. 2006-162825, the monomer in the part exposed to the ultraviolet light is changed to a polymer by the photopolymerization reaction. However, since the manner of the monomer moving to the part exposed to the ultraviolet light is by diffusion, the time required to form the polymer is significantly long.

SUMMARY

A liquid crystal display device in an embodiment according to the present invention includes a first substrate, a second substrate facing the first substrate, a liquid crystal layer between the first substrate and the second substrate, the liquid crystal layer being enclosed by a sealing member, a first protrusion in one of the first substrate and the second substrate in a region inner to the sealing member, the first protrusion protruding toward the other of the first substrate and the second substrate, and a resin component bonding the other of the first substrate and the second substrate and the first protrusion to each other.

DESCRIPTION OF EMBODIMENTS

Figure 1:
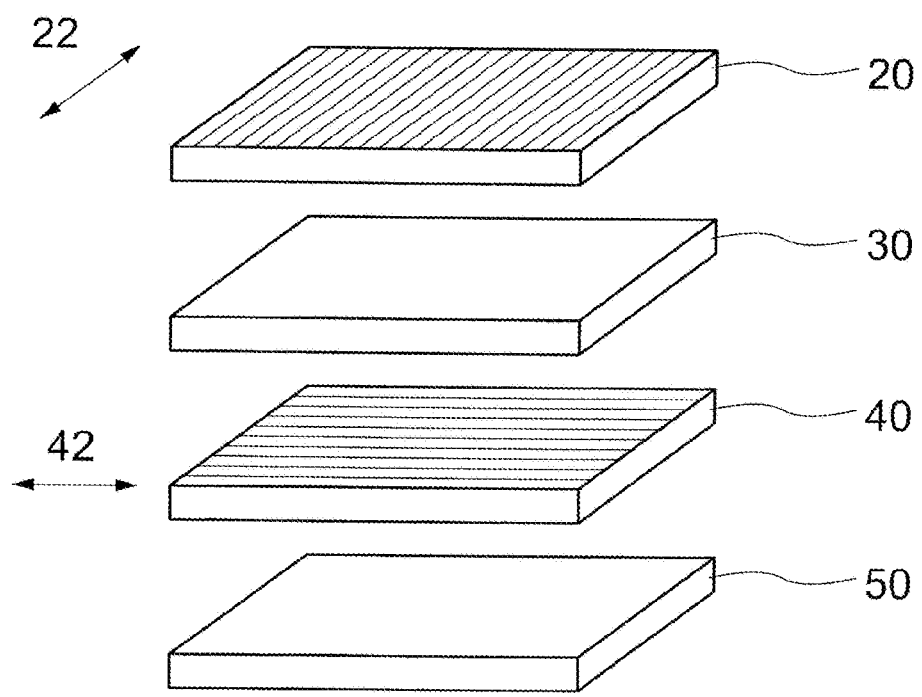
FIG. 1 is a structural view of a liquid crystal module including a liquid crystal display device in an embodiment according to the present invention.

Hereinafter, embodiments of the present invention will be described with reference to the drawings. The disclosure merely provides examples, and alternations and modifications easily conceivable by a person of ordinary skill in the art without departing from the gist of the present invention are duly encompassed in the scope of the present invention. In the drawings, components may be shown schematically regarding the width, thickness, shape and the like, instead of being shown in accordance with the actual sizes, for the sake of clear illustration. The drawings merely show examples and do not limit the interpretations of the present invention in any way. In the specification and the drawings, components that are substantially the same as those shown in a previous drawing(s) bear the identical reference signs with alphabetical letters, and detailed descriptions thereof may be omitted.

In the embodiments of the present invention, a direction from an array substrate, having a transistor provided thereon, toward a counter substrate facing the array substrate is referred to as "above" or "upward". By contrast, a direction from the counter substrate toward the array substrate is referred to as "below" or "downward". For the sake of explanation, the term "up", "down", "above", "below" or the like may be used to describe a direction in this manner. However, for example, a first member and a second member may be located so as to have an opposite positional relationship in the up-down direction. In the following description, an expression that "second member on (above, under or below) the first member" merely describes a positional relationship between the first member and the second member in the up-down direction. The expression represents a concept encompassing a case where another component is provided between the first member and the second member. Even in the case where the "first member" is located below the "second member" in the drawing(s), if the second member is located on the first member in the production method, the expression "the second member on the first member" may be used. The following embodiments have an object of shortening the time required to form a polymer.

Embodiment 1

With reference to FIG. 1 to FIG. 5F, an overview of a liquid crystal display device in an embodiment 1 according to the present invention will be described. In embodiment 1, an example in which a liquid crystal display device (LCD) is used as a display device will be described. Especially, a structure of spacers provided in the liquid crystal display device, more specifically, provided between a transistor array substrate (hereinafter, referred to simply as an "array substrate") and a counter substrate bonded to the array substrate while facing the array substrate will be described. The spacers are provided in order to prevent the distance between the two substrates from being varied and also to prevent the two substrates from being shifted in a planar direction.

[Structure of the Liquid Crystal Module 10]

FIG. 1 is a structural view of a liquid crystal module 10 including a liquid crystal display device 30 in embodiment 1 according to the present invention. As shown in FIG. 1, the liquid crystal module 10 in this embodiment includes a first polarizer plate 20, the liquid crystal display device 30, a second polarizer plate 40, and a backlight unit 50. The liquid crystal display device 30 is provided between the first polarizer plate 20 and the second polarizer plate 40. A polarization axis 22 of the first polarizer plate 20 is perpendicular to a polarization axis 42 of the second polarizer plate 40. Alternatively, the polarization axis 22 of the first polarizer plate 20 may be parallel to the polarization axis 42 of the second polarizer plate 40. The backlight unit 50 is located on the side opposite to the liquid crystal display device 30 with respect to the second polarizer plate 40. The backlight unit 50 is located outer to the pair of polarizer plates (the first polarizer plate 40 and the second polarizer plate 20) and on the side opposite to the side where a user visually recognizes a displayed video.

The first polarizer plate 20 and the second polarizer plate 40 each transmit light polarized in a specific direction. The second polarizer plate 40 has an optical function of absorbing light polarized in a direction perpendicular to the polarization direction of light transmitted through the first polarizer plate 20. The first polarizer plate 20 and the second polarizer plate 40 are respectively located on two sides of the liquid crystal display device 30 such that the polarization directions thereof are perpendicular to each other. Such a positional arrangement allows display to be provided by use of an optical shutter effect. The first polarizer plate 20 and the second polarizer plate 40 may each have, for example, a multi-layer structure. Such a multi-layer structure includes a poly(vinylalcohol) (PVA) main portion, iodine compound molecules adsorbed, in an aligned manner, to the poly (vinylalcohol) (PVA) main portion, and a plurality of protective layers formed of triacetylcellulose (TAC), polyethyleneterephthalate (PET) or the like.

The backlight unit 50 is a light source providing light from a rear side of the liquid crystal display device 30 toward the liquid crystal display device 30. The backlight unit 50 is a uniform planar light source. The backlight unit 50 is generally available in an edge light type or a direct type. In an edge light-type backlight unit, a light emission source such as an LED or the like is located only at an edge of the liquid crystal display device 30, not on a rear surface thereof. Light emitted from the light emission source is guided to the entirety of the screen of the liquid crystal display device 30 by components such as a light guide plate, a reflective sheet, a diffusive sheet, a prism sheet and the like having a light collection function or a light diffusion function. In a direct-type backlight unit, a light emission source such as an LED or the like is located just below the liquid crystal display device 30.

[Overall Structure of the Liquid Crystal Display Device 30]

Figure 2:
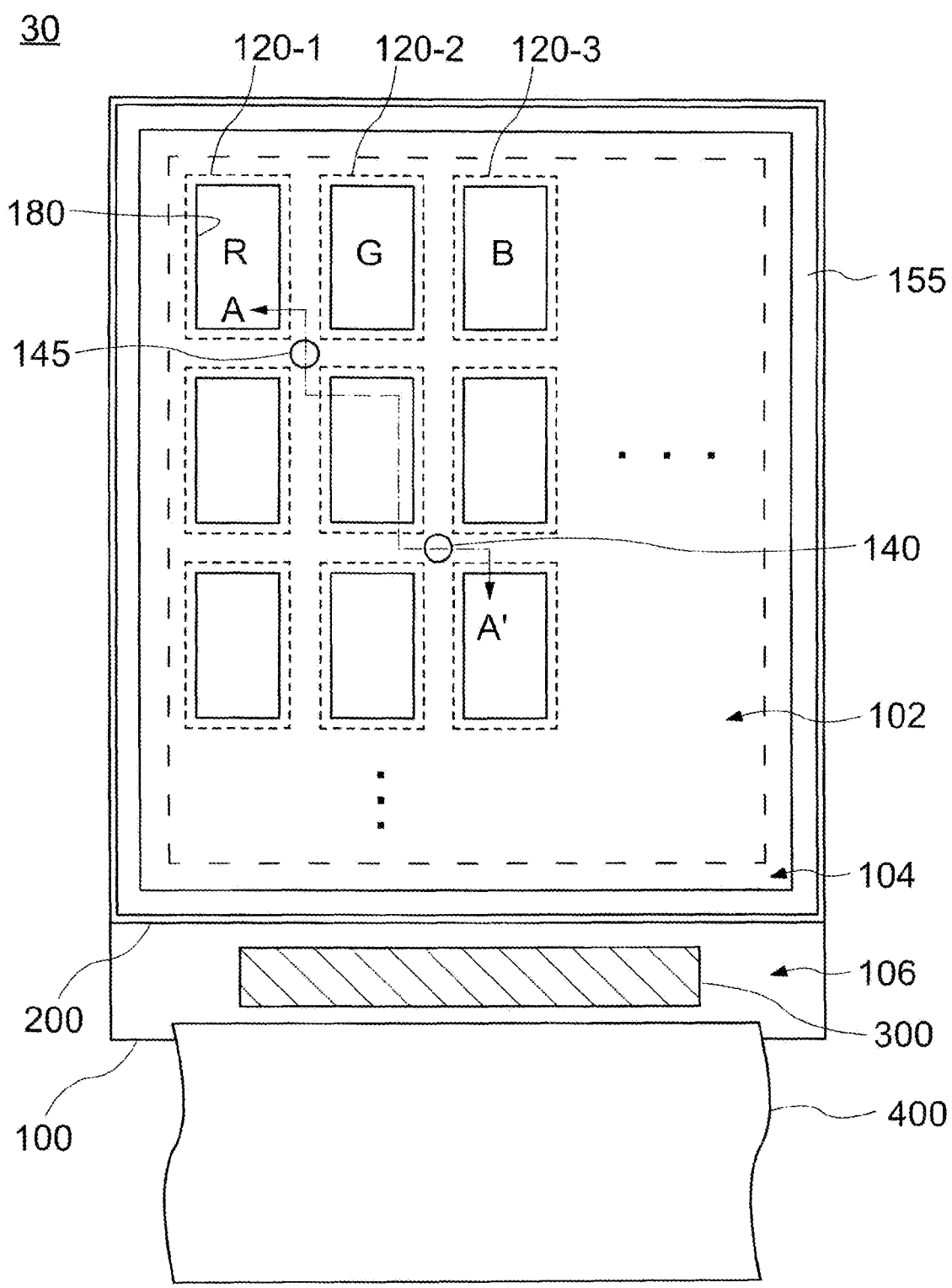
FIG. 2 is a plan view showing an overall structure of the liquid crystal display device in an embodiment according to the present invention.

FIG. 2 is a plan view showing an overall structure of the liquid crystal display device 30 in embodiment 1 according to the present invention. As shown in FIG. 2, the liquid crystal display device 30 includes an array substrate 100, a counter substrate 200, an IC chip 300, and an FPC (flexible printed circuit) 400. A pixel for a single color used to realize full color display is referred to as a "sub pixel", and a minimum unit of sub pixels realizing full color display or white display is referred to as a "main pixel". In the description of the embodiments in this specification, the "pixel" refers to a sub pixel unless otherwise specified.

[Plan View of the Liquid Crystal Display Device 30]

The array substrate 100 has a plurality of pixels located thereon in a matrix. The pixels each include a pixel electrode 120. The pixel electrode 120 forms an electric field controlling the alignment of liquid crystal molecules in a liquid crystal layer (represented by the reference numeral 150 in FIG. 3) provided between the array substrate 100 and the counter substrate 200. In the example shown in FIG. 2, one main pixel includes a sub pixel displaying red, a sub pixel displaying green, and a pixel displaying blue, and these sub pixels respectively include a pixel electrode for red 120-1, a pixel electrode for green 120-2, and a pixel electrode for blue 120-3 (in the case where the pixel electrodes 120-1, 120-2 and 120-3 are not specifically distinguished from each other, these pixel electrodes will each be referred to as a "pixel electrode 120"). The structure of the main pixel is not limited to the above, and may have any of various structures. For example, the main pixel may include four types of sub pixels, namely, sub pixels displaying red, green, blue and white.

A region of the array substrate 100 on which the above-described pixels are provided is referred to as a "display region 102". A region around the display region 102 is referred to as a "peripheral region 104". On the peripheral region 104, driving circuits (not shown) are located. The driving circuits control the voltage to be applied to the pixel electrodes 120. An end region of the peripheral region 104 is referred to as a "driving region 106". In the driving region 106, the array substrate 100 is exposed from the counter substrate 200. On the driving region 106 of the array substrate 100, the IC chip 300 and the FPC 400 are located. The IC chip 300 is mounted on the array substrate 100 via a bump or the like. For example, the IC chip 300 may be mounted by a method of COG (Chip On Glass) or the like. The IC chip 300 is connected with lines formed on the array substrate 100 and is connected with the driving circuits via the lines. The FPC 400 is connected with the IC chip 300. The FPC 400 is connected with an external device.

A video signal supplied from the external device is input to the IC chip 300 via the FPC 400. The IC chip 300 drives the above-described driving circuits. The driving of the driving circuits causes the video signal (or a gray scale signal) to be supplied to the pixel electrodes 120 located in the display region 102. As a result, an image based on the video signal is displayed on the display region 102.

Spacers 140 and 145 are located between the pixel electrodes 120. As seen in a plan view, the spacers 140 and 145 do not overlap the pixel electrodes 120. The spacers 140 and 145 are not provided in correspondence with each of all the pixels, but one spacer 140 or 145 is provided for a pixel unit, namely, for a plurality of pixels. Alternatively, the spacers 140 and 145 may be provided in correspondence with each of all the pixels. In the example of FIG. 2, the spacers 140 and 145 are circular. The spacers 140 and 145 are not limited to having such a shape. The spacers 140 and 145 may be rectangular, elliptical, frame-shaped or of any of various other shapes.

On the counter substrate 200, a light blocking layer 180 is provided. The light-blocking layer 180 has openings in positional correspondence with the pixel electrodes 120. The openings in the light-blocking layer 180 each correspond to a region inner to an outer periphery of the corresponding pixel electrode 120. In other words, an end of each pixel electrode 120 is covered with the light-blocking layer 180. As described below in detail, the light-blocking layer 180 also has an opening in positional correspondence with the spacer 145.

The array substrate 100 and the counter substrate 200 are bonded together with a sealing member 155. The sealing member 155 is provided along an outer periphery of the counter substrate 200. The array substrate 100, the counter substrate 200 and the sealing member 155 encloses and seals a space to be filled with the liquid crystal layer 150 (see FIG. 3).

[Cross-Sectional View of the Liquid Crystal Display Device 30]

Figure 3:
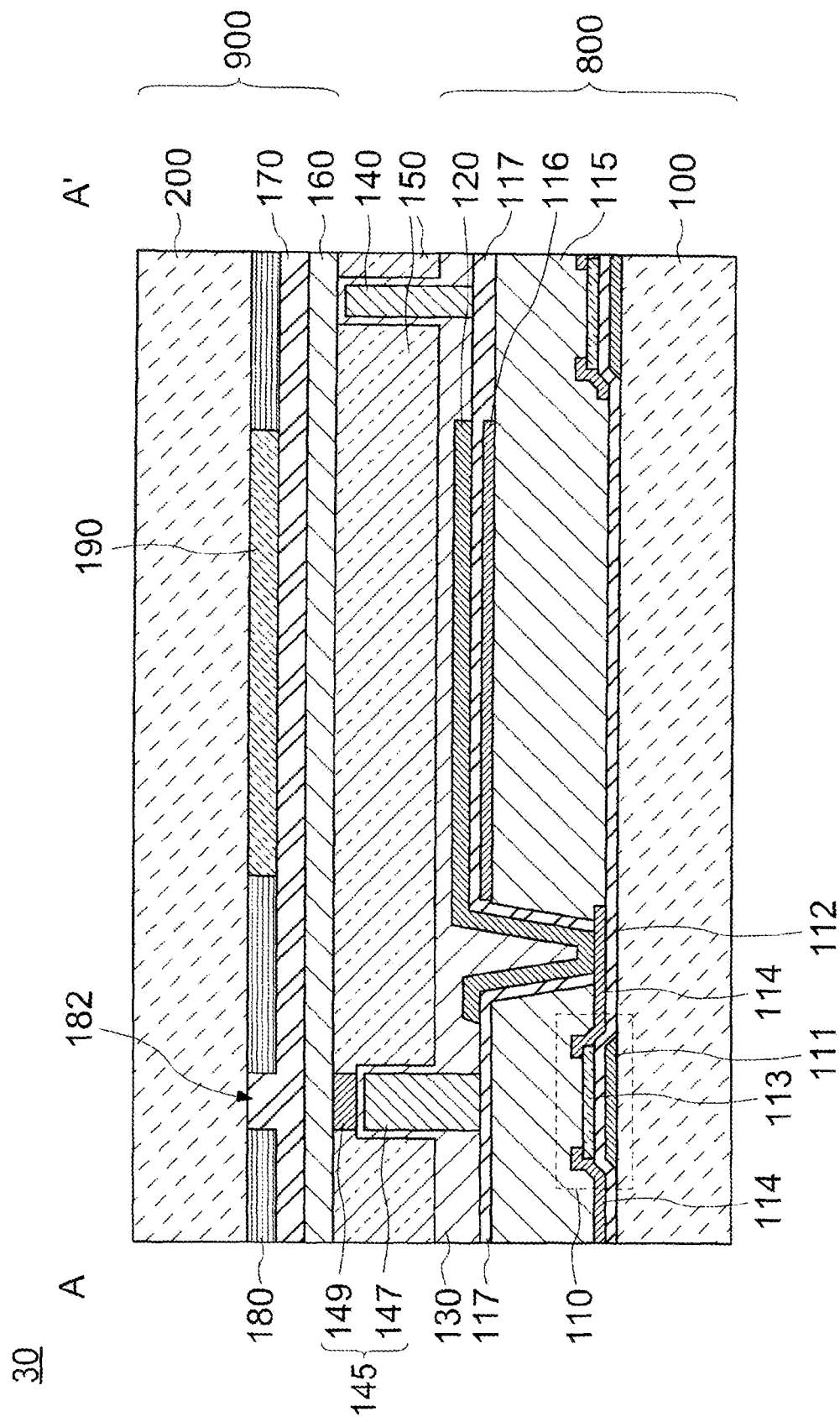
FIG. 3 is a cross-sectional view of the liquid crystal display device in an embodiment according to the present invention, taken along line A-A' in FIG. 2.

FIG. 3 is a cross-sectional view of the liquid crystal display device 30 in embodiment 1 according to the present invention, taken along line A-A' in FIG. 2. As shown in FIG. 3, the liquid crystal display device 30 includes a first substrate 800, a second substrate 900, and the spacers 140 and 145. As shown by the line A-A' in FIG. 2, the cross-section shown in FIG. 3 is of a region inner to the sealing member 155. The first substrate 800 and the second substrate 900 are present inner to and outer to the sealing member 155. The first substrate 800 and the second substrate 900 are located to face each other. The liquid crystal layer 150 and the spacers 140 and 145 are present inner to the sealing member 155. The liquid crystal layer 150 and the spacers 140 and 145 are located between the first substrate 800 and the second substrate 900.

The first substrate 800 includes the array substrate 100, transistors 110, an insulating layer 115, a common electrode 116, an insulating layer 117, the pixel electrodes 120 (one pixel electrode 120 is shown in FIG. 3), and an alignment film 130. The transistors 110 are located on the array substrate 100. The transistors 110 each include a gate electrode 111, a gate insulating layer 112, a semiconductor layer 113, and source and drain electrodes 114. The first substrate 800 may include a component other than the above. Namely, the first substrate 800 includes the array substrate 100 and components provided between the array substrate 100 and the spacers 140 and 145. In the example of FIG. 3, the transistors 110 are of a bottom gate type, in which the gate electrode 111 is located below the semiconductor layer 113. The transistors 110 may be referred to as "switching elements".

The insulating layer 115 is located above the transistors 110. The common electrode 116 is located on the insulating layer 115. The insulating layer 117 is located on the common electrode 116. The pixel electrode 120 is located on the insulating layer 117. The insulating layer 115 has an opening provided therein, and the insulating layer 117 and the pixel electrode 120 are located also in the opening. In the opening of the insulating layer 115, the insulating layer 117 has an opening provided therein. The pixel electrode 120 is connected with the source and drain electrodes 114 at a bottom of the opening provided in the insulating layer 115 and the insulating layer 117. The alignment film 130 is located on the pixel electrode 120. A surface of the alignment film 130 is alignment-treated with a rubbing cloth or ultraviolet light.

The pixel electrode 120 and the common electrode 116 overlap each other at least partially as seen in a plan view.

The second substrate 900 includes the counter substrate 200, color filters 190 (one color filter 190 is shown in FIG. 3), the light-blocking layer 180, an overcoat film 170, and an alignment film 160. The color filter 190 and the light-blocking layer 180 are located below the counter substrate 200. The light-blocking layer 180 has an opening 182 provided therein. The overcoat layer 170 is located below the color filter 190 and the light-blocking layer 180. The overcoat layer 170 is also located in the opening 182, and thus alleviates the step in the light-blocking layer 180 formed by the opening 182. The alignment film 160 is located below the overcoat film 170. A surface of the alignment film 160 is alignment-treated like the alignment film 130. The second substrate 900 may include a component other than the above. Namely, the second substrate 900 includes the counter substrate 200 and components provided between the counter substrate 200 and the spacers 140 and 145. In the example of FIG. 3, the color filter 190 and the light-blocking layer 180 are in contact with each other along side surfaces thereof and do not overlap each other. Alternatively, the color filter 190 and the light-blocking layer 180 may overlap each other.

In the example of FIG. 3, the light-blocking layer 180 is located between the counter substrate 200 and the alignment film 160. The liquid crystal display device 30 is not limited to having such a structure. For example, the light-blocking layer 180 may be provided above the counter substrate 200, namely, on the side opposite to alignment film 160 with respect to the counter substrate 200. Alternatively, the light-blocking layer 180 may be located between the array substrate 100 and the alignment film 130. Still alternatively, the light-blocking layer 180 may be located below the array substrate 100, namely, on the side opposite to the alignment film 130 with respect to the array substrate 100.

The color filters 190 each transmit light of a specific wavelength and thus display a color. In general, the color filters 190 respectively display three primary colors of red (R), green (G) and blue (B). In the liquid crystal display device 30, the RGB patterns are arrayed in row and column directions. Light emitted from the backlight unit shown in FIG. 1 have the brightness thereof adjusted by the alignment of the liquid crystal molecules in the liquid crystal layer 150. The brightness adjustment performed on the light of the RGB colors by the liquid crystal layer 150 provides various colors. The color filters 190 are located on the side of a front surface of the liquid crystal display device 30 (side visually recognized by the user) in order to decrease the influence of reflection by the transistors 110 and the lines located on the array substrate 100. Alternatively, the color filters 190 may be located on the side of a rear surface of the liquid crystal display device 30.

The light-blocking layer 180 is located to demarcate the pixels. In other words, the light-blocking layer 180 is located to be between pixels adjacent to each other among the plurality of pixels. In still other words, the light-blocking layer 180 demarcates the color filters 190 adjacent to each other among the plurality of color filters 190. The light-blocking layer 180 is provided in order to prevent light from leaking in a region, of the display region 102, where the alignment of the liquid crystal molecules in the liquid crystal layer 150 is not controlled (e.g., the region where the transistors 110 are located, or the peripheral region 104 where the pixel electrodes are not provided). The light-blocking layer 180 also has a function of preventing light reflected by the transistors 110, the lines and the like on the array substrate 100 from leaking outside.

As described above, the overcoat layer 170 alleviates the step formed by the color filter 190 and the light-blocking layer 180. The overcoat film 170 is required to have a high level of property in the film hardness (tolerance against the alignment treatment), adherence, heat resistance, chemical resistance, transparency and the like. For example, the overcoat film 170 may be formed of acrylic resin or epoxy resin.

As described below in detail, the spacers 140 and 145 are located between the alignment film 130 and the insulating layer 117. The spacers 140 and 145 are located on the side of the first substrate 800 and protrude toward the second substrate 900 from the first substrate 800. In other words, the spacers 140 and 145 are located on a component provided on the array substrate and protrude from the component toward the alignment film 160 below the counter substrate 200.

The spacers 140 and 145 overlap the transistors 110 as seen in a plan view. In other words, the spacers 140 and 145 are located at different positions from that of the pixel electrode 120 as seen in a plan view. Alternatively, the spacers 140 and 145 may not overlap the transistors 110 and may overlap the lines connected with the transistors 110 as seen in a plan view. It is preferable that the spacer 140 and the spacer 145 have approximately the same height as each other.

In the example of FIG. 3, the spacers 140 and 145 are below the alignment film 130 and are in contact with the insulating layer 117. The liquid crystal display device 30 is not limited to having such a structure. For example, the spacers 140 and 145 may be in contact with an insulating layer or a conductive layer below the insulating layer 117. For example, the spacers 140 and 145 may be in contact with the insulating layer 115, which is located below the insulating layer 117. Another film may be provided between the spacers 140 and 145 and the insulating layer 117. The spacers 140 and 145 may be located on the alignment film 130.

In the example of FIG. 3, the spacers 140 and 145 are in contact with the alignment film 160. The liquid crystal display device 30 is not limited to having such a structure. For example, the spacers 140 and 145 may be in contact with a layer above the alignment film 160. For example, the spacers 140 and 145 may be in contact with the overcoat film 170, which is located above the alignment film 160. Another film may be provided between the spacers 140 and 145 and the alignment film 160.

As shown in FIG. 2, the first substrate 800 and the second substrate 900 are bonded together with the sealing member 155. The space between the first substrate 800 and the second substrate 900 is filled with the liquid crystal layer 150. The spacers 140 and 145 act to maintain the space between the first substrate 800 and the second substrate 900 (cell gap).

The alignment films 130 and 160 each have an interface with the liquid crystal layer 150. Namely, the alignment films 130 and 160 are each in contact with the liquid crystal layer 150. A basic function of the alignment films 130 and 160 is to align the liquid crystal molecules in the liquid crystal layer 150 in a predetermined direction. The liquid crystal molecules are aligned by, for example, an alignment treatment of rubbing the surface of each of the alignment films 130 and 160 in one direction with a cloth or the like, or by a radiation treatment of directing ultraviolet light toward the alignment films 130 and 160.

The pixel electrode 120 and the common electrode 116 are at least located at different positions as seen in a plan view. Therefore, when a potential difference is caused between the pixel electrode 120 and the common electrode 116, an electric field is generated in a lateral direction (direction parallel to a main surface of the array substrate 100) in the liquid crystal layer 150. Namely, the liquid crystal display device 30 shown in FIG. 3 is of a lateral field driven type. The pixel electrode 120 and the common electrode 116 may have overlapping regions as seen in a plan view. In the example of FIG. 3, the liquid crystal display device 30 is of the lateral field driven type. The liquid crystal display device 30 is not limited to being of this type. For example, the liquid crystal display device 30 may be of a vertical field driven type, in which the common electrode 116 is located on the side opposite to the pixel electrodes 120 with respect to the liquid crystal layer 150 and thus an electric field is generated in a vertical direction (direction perpendicular to the main surface of the array substrate 100) in the liquid crystal layer 150.

[Structure of the Spacers 140 and 145]

Figure 4:
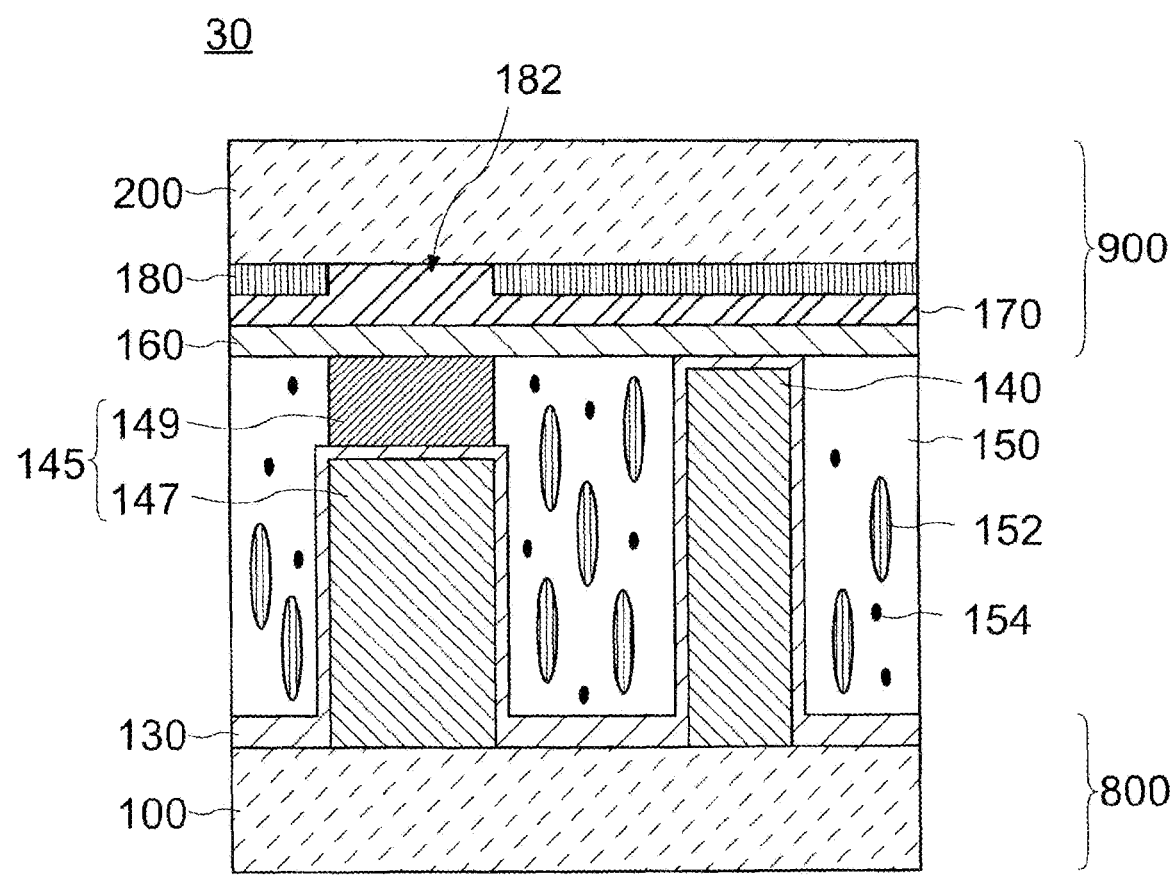
FIG. 4 is a cross-sectional view showing structures of a liquid crystal layer and protrusions in the liquid crystal display device in an embodiment according to the present invention.

With reference to FIG. 4, the structure of each of the spacers 140 and 145 and the positional relationship between the spacer 145 and the light-blocking layer 180 will be described in more detail. FIG. 4 is a cross-sectional view showing the structure of the liquid crystal layer 150 and the spacers 140 and 145 in the liquid crystal display device 30 in embodiment 1 according to the present invention. FIG. 4 omits the components located between the array substrate 100 and the alignment film 130 for the sake of simple description. The following description will be given with reference to FIG. 3 and FIG. 4.

As shown in FIG. 4, the liquid crystal layer 150 and the spacers 140 and 145 are located between the first substrate 800 and the second substrate 900. The spacer 145 includes a stepped portion 147 and a polymer portion 149. The liquid crystal layer 150 contains liquid crystal molecules 152 and monomer particles 154. The liquid crystal molecules 152 and the monomer particles 154 are distributed randomly in the liquid crystal layer 150. The monomer particles 154 are polymerized by ultraviolet light to be changed to the polymer portion 149. Namely, the monomer particles 154 are of an ultraviolet-curable monomer, which is curable by ultraviolet light.

The spacer 140 is a protrusion protruding from the first substrate 800 toward the second substrate 900. Like the spacer 140, the stepped portion 147 is a protrusion protruding from the first substrate 800 toward the second substrate 900. A part of the alignment film 130 goes beyond the spacer 140 and the stepped portion 147. In other words, a part of the alignment film 130 is located on a side surface and a top surface of each of the spacer 140 and the stepped portion 147. The spacer 140 and a part of the alignment film 130 going beyond the spacer 140 may be collectively referred to as a "protrusion". Similarly, the stepped portion 147 and a part of the alignment film 130 going beyond the stepped portion 147 may be collectively referred to as a "protrusion". The polymer portion 149 is located on the part of the alignment film 130 that is located on the top surface of the stepped portion 147. The polymer portion 149 is formed of a material different from that of the stepped portion 147, and is a resin component containing a resin. The stepped portion 147 is lower than the spacer 140. The height of the stepped portion 147 is greater than the thickness of the alignment film 130. The stepped portion 147 is formed in the same step as the spacer 140. In other words, the stepped portion 147 is in the same layer as, and is formed of the same material as, the spacer 140. In still other words, the stepped portion 147 and the spacer 140 are in contact with an underlying layer continued from an area below the stepped portion 147 to an area below the spacer 140. Referring to FIG. 3, the underlying layer is the insulating layer 117. The parts of the alignment film 130 that are located on the top surface of the spacer 140 and the top surface of the stepped portion 147 are thinner than a part of the alignment film 130 that is located on a region of the first substrate 800 on which neither the spacer 140 nor the stepped portion 147 is located.

The spacer 140 has a width different from that of the spacer 145. Specifically, the spacer 145 is wider than the spacer 140. As seen in a plan view, the spacer 145 has an area size greater than that of the spacer 140. Alternatively, the area size of the spacer 145 may be equal to that of the spacer 140, or may be smaller than that of the spacer 140 as seen in a plan view.

The spacer 140 is bonded to the component below the alignment film 130 on the side of the array substrate 100. In other words, the spacer 140 is bonded to the first substrate 800. Specifically, the spacer 140 is bonded to the insulating layer 117. The spacer 140 is in contact with the alignment film 160 on the side of the counter substrate 200 while having the alignment film 130 between the spacer 140 and the alignment film 160, but is not bonded to the alignment film 160. In other words, the protrusion (the spacer 140 and the part of the alignment film 130 that is on the spacer 140) is in contact with the second substrate 900, but is not bonded to the second substrate 900. Namely, the protrusion is slidably in contact with the alignment film 160. In the example of FIG. 3 and FIG. 4, the protrusion is in contact with the alignment film 160. The liquid crystal display device 30 is not limited to having such a structure. For example, the protrusion may not be in contact with the alignment film 160 in the state where no external force is applied to the liquid crystal display device 30, and may contact the alignment film 160 when an external force is applied to the liquid crystal display device 30.

The spacer 145 is bonded to both of the first substrate 800 and the second substrate 900. Namely, the stepped portion 147 is bonded to the first substrate 800. The polymer portion 149 is bonded to the second substrate 900. Specifically, the stepped portion 147 is bonded to the insulating layer 117. The polymer portion 149 is bonded to the alignment film 160. The stepped portion 147 and the polymer portion 149 are bonded to each other while having the alignment film 130 therebetween. The above-described structure may be expressed as follows. The polymer portion 149, which is a resin component, bonds the second substrate 900 and the stepped portion 147 bonded to the first substrate 800 to each other. In this specification, the term "bond" refers to a state where a force is needed to peel off the second substrate 900 from the first substrate 800. The "bond" encompasses both of a chemical adsorption and a physical adsorption.

The spacer 140 overlaps the light-blocking layer 180 as seen in a plan view. The opening 182 in the light-blocking layer 180 overlaps the spacer 145 as seen in a plan view. Namely, when light is directed toward the liquid crystal display device 30 from the counter substrate 200, the light passes the opening 182 and is directed toward a region of the liquid crystal layer 150 where the spacer 145 is located. The opening 182 is provided to direct ultraviolet light toward the liquid crystal layer 150. When the ultraviolet light is directed toward the liquid crystal layer 150, the monomer particles 154 in the liquid crystal layer 150 are cured to become the polymer portion 149. The ultraviolet light that is output from the counter substrate 200 passes the opening 182 and is directed toward the liquid crystal layer 150 and the stepped portion 147. It is preferable that the counter substrate 200, the overcoat film 170 and the alignment film 160 easily transmit ultraviolet light. As long as ultraviolet light is directed toward a region where the polymer portion 149 is to be formed, the light-blocking layer 180 does not need to have the opening 182 formed therein.

For example, the light-transmissive components included in the second substrate 900 (the counter substrate 200, the overcoat film 170 and the alignment film 160) may have a higher transmittance for ultraviolet light than the light-transmissive components included in the first substrate 800 (the array substrate 100, the gate insulating layer 112, the insulating layers 115 and 117, and the alignment film 130). Such a structure may be rephrased by a simple expression that the transmittance of the second substrate 900 for ultraviolet light is higher than the transmittance of the first substrate 800 for ultraviolet light.

In the example of FIG. 3 and FIG. 4, the stepped portion 147 is as wide as the polymer portion 149. The liquid crystal display device 30 is not limited to having such a structure. For example, the polymer portion 149 may be wider than the stepped portion 147, or may be narrower than the stepped portion 147. The polymer portion 149 may be located on a side surface of the stepped portion 147 in addition to on the top surface of the stepped portion 147.

[Materials of the Components]

The array substrate 100 and the counter substrate 200 may each be a visible light-transmissive substrate. For example, the array substrate 100 and the counter substrate 200 may each be a glass substrate or a quartz substrate. The glass substrate may be formed of alkali-free glass. Alternatively, the array substrate 100 and the counter substrate 200 may each be a flexible substrate. The flexible substrate may be formed of, for example, polyimide resin, acrylic resin, epoxy resin, silicone resin, fluorine resin, siloxane resin, polyethyleneterephthalate resin, polyethylenenaphthalate resin, polyacrylonitrile resin, polymethylmethacrylate resin, polycarbonate resin, polyethersulfone resin, polyamide resin, cycloolefin resin, polystyrene resin, polyamideimide resin, poly(vinylchloride) resin, or the like. The array substrate 100 and the counter substrate 200 may be formed of the same material as, or different materials from, each other. For example, the transmittance of the counter substrate 200, which transmits ultraviolet light, for the ultraviolet light may be higher than the transmittance of the array substrate for the ultraviolet light.

The array substrate 100 and the counter substrate 200 may be formed of a flexible plastic material, so that the liquid crystal display device 30 is difficult to be broken, is lightweight, or is easily bendable.

The alignment films 130 and 160 and the overcoat film 170 may be formed of polyimide resin, acrylic resin, epoxy resin, silicone resin, fluorine resin, siloxane resin, polyethyleneterephthalate resin, polyethylenenaphthalate resin, polyacrylonitrile resin, polymethylmethacrylate resin, polycarbonate resin, polyethersulfone resin, polyamide resin, cycloolefin resin, polystyrene resin, polyamideimide resin, poly(vinylchloride) resin, or the like. The alignment films 130 and 160 and the overcoat film 170 may be formed of the same material as, or different materials from, each other. Among these materials, polyimide resin is preferable.

The liquid crystal layer 150 may be formed of any of various liquid crystal materials including a nematic liquid crystal material, a smectic liquid crystal material, a cholesteric liquid crystal material, a discotic liquid crystal material, a blue phase liquid crystal material, and the like.

The spacer 140 and the stepped portion 147 of the spacer 145 may be formed of a photosensitive resin. Any known resin material is usable as the photosensitive resin. It is preferable to use acrylic resin, silicone-based resin, fluorine-based resin, polycarbonate-based resin, epoxy-based resin or urethane-based resin. In this embodiment, the spacer 140 and the stepped portion 147 of the spacer 145 are formed of the same material as each other. Alternatively, the spacer 140 and the stepped portion 147 of the spacer 145 may be formed of different materials from each other.

The resin material usable to form the polymer portion 149 is not limited to a monomer, but may be an oligomer. In the case where a material that advances the polymerization reaction more quickly and increases the post-polymerization molecular weight more significantly is used to form the polymer portion 149, the polymer and the liquid crystal material (having a low molecular weight) is phase-separated more easily. Therefore, it is preferable that the monomer particles 154 are formed of a polyfunctional resin material. Alternatively, the monomer particles 154 may be formed of a monofunctional resin material. It is also desirable that the monomer particles 154 are formed of a monomer highly soluble in a liquid crystal material. A preferable material used to form the monomer particles 154 is a monomer containing a phenyl group, a cyclohexane group or the like. Materials usable to form the polymer portion 149 also include polyethylene resin, polypropylene resin, polyolefin resin, acrylic resin, methacrylic resin, epoxy resin, urethane resin, polystyrene resin, poly(vinyl alcohol) resin, fluorine-based resin (e.g., polytetrafluoroethylene, etc.), and a copolymer thereof.

Among various types of monomers, a monomer having molecules aligned together with the liquid crystal molecules is especially useful. Such a monomer is a liquid crystalline monomer (having optical anisotropy although being liquid); more specifically, lengthy molecules of such a monomer are aligned spontaneously. The liquid crystalline monomer has lengthy molecules as described above. The liquid crystalline monomer has a molecular framework including a rod-like rigid portion (core) and a rod-like flexible portion. Like a nematic liquid crystal material, the liquid crystalline monomer has a property of being spontaneously aligned at, or in the vicinity of, room temperature. The concentration of the monomer to be mixed in the liquid crystalline monomer is appropriately 3% by weight or higher and 40% by weight or lower. In the case where the degree of dispersion of the polymer network is too low, the effect of bonding the substrates to each other is not sufficiently high. In the case where the degree of dispersion of the polymer network is too high, the voltage response of the liquid crystal molecules is adversely influenced. In this case, even if a high voltage is applied, the liquid crystal molecules are not driven. For these reasons, an optimal value of the concentration of the monomer needs to be found based on the type of the liquid crystal material and the polymer and the dispersion structure thereof. A material containing such a monomer is, for example, UCL-011 (DIC corporation), which is acrylic.

As the intensity of the ultraviolet light directed toward the mixed solution is higher, the polymer is deposited and cured more rapidly and the resultant polymer network is more microscopic and more firm. A preferably light source usable for directing the ultraviolet light is a high-output mercury xenon lamp, a super high-pressure mercury lamp, an excimer lamp, a xenon lamp or the like. Such a lamp releases ultraviolet light having a long wavelength (especially, wavelength of 365 nm) efficiently. A light source other than the above may be used. As a result of the release of the ultraviolet light, the operating voltage and the response speed of the liquid crystal material, and basic light modulation characteristics such as the contrast and the like are controlled.

The light-blocking layer 180 may be formed of a light-blocking material. The light-blocking layer 180 may be formed of a material having a low transmittance and a low reflectance for visible light. For example, the light-blocking layer 180 may be formed of a black resin or chromium (Cr).

As described above, in the liquid crystal display device 30 in embodiment 1, the spacer 145 bonds the first substrate 800 and the second substrate 900 to each other. Therefore, the distance between the first substrate 800 and the second substrate 900 is kept constant. As a result, the thickness of the liquid crystal layer 150 is kept constant. The liquid crystal display device 30 in embodiment 1 suppresses the first substrate 800 from being shifted with respect to the second substrate 900 in a planar direction. As a result, when, for example, the liquid crystal display device 30 is curved in the state where the first substrate 800 and the second substrate 900 are bonded to each other, the first substrate 800 is suppressed from being shifted with respect to the second substrate 900 in a planar direction due to the difference in the degree of deflection between the first substrate 800 and the second substrate 900.

[Method for Producing the Liquid Crystal Display Device 30]

With reference to FIG. 5A to FIG. 5F, which are cross-sectional views, a method for producing the liquid crystal display device 30 will be described. In this example, a method for forming the transistors 110, the pixel electrodes 120 and the components provided between the array substrate 100 and the alignment film 130 is omitted, and a method for producing the components shown in FIG. 4 will be described. More specifically, a method for forming the spacers 140 and 145 by use of a positive photosensitive resin material and an ultraviolet-curable monomer will be described with reference to FIG. 5A to FIG. 5F.

Figure 5A:
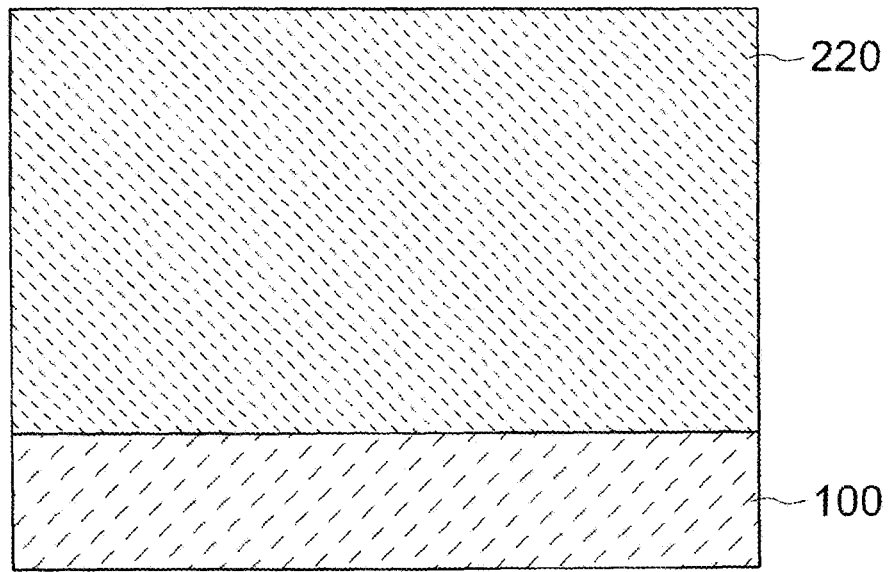
FIG. 5A is a cross-sectional view showing a step of forming a resin layer used to form a spacer and a stepped portion in a method for producing the liquid crystal layer and spacers in the liquid crystal display device in an embodiment according to the present invention.

FIG. 5A is a cross-sectional view showing a step of forming a resin layer used to form the spacers 140 and the stepped portion 147 in the method for producing the liquid crystal layer 150 and the spacers 140 and 145 in the liquid crystal display device 30 in embodiment 1 according to the present invention. As shown in FIG. 5A, a photosensitive resin layer 220 is formed on the array substrate 100. The photosensitive resin layer 220 is formed by application. For example, while the array substrate 100 is rotated, a solution containing a resin material that is to become the photosensitive resin layer 220, dissolved therein is applied to the array substrate 100 by spin-coating, and a solvent is vaporized by heating. Thus, the photosensitive resin layer 220 is formed. The photosensitive resin layer 220 may be formed by application using a slit coater or by dipping, instead of by the above-described spin-coating. In this embodiment, a positive photosensitive material is used to form the photosensitive resin layer 220, which is used to form the spacer 140 and the stepped portion 147. A positive photosensitive material is poorly soluble in a developing solution, but is changed to be easily soluble in the developing solution when being exposed to light.

Figure 5B:
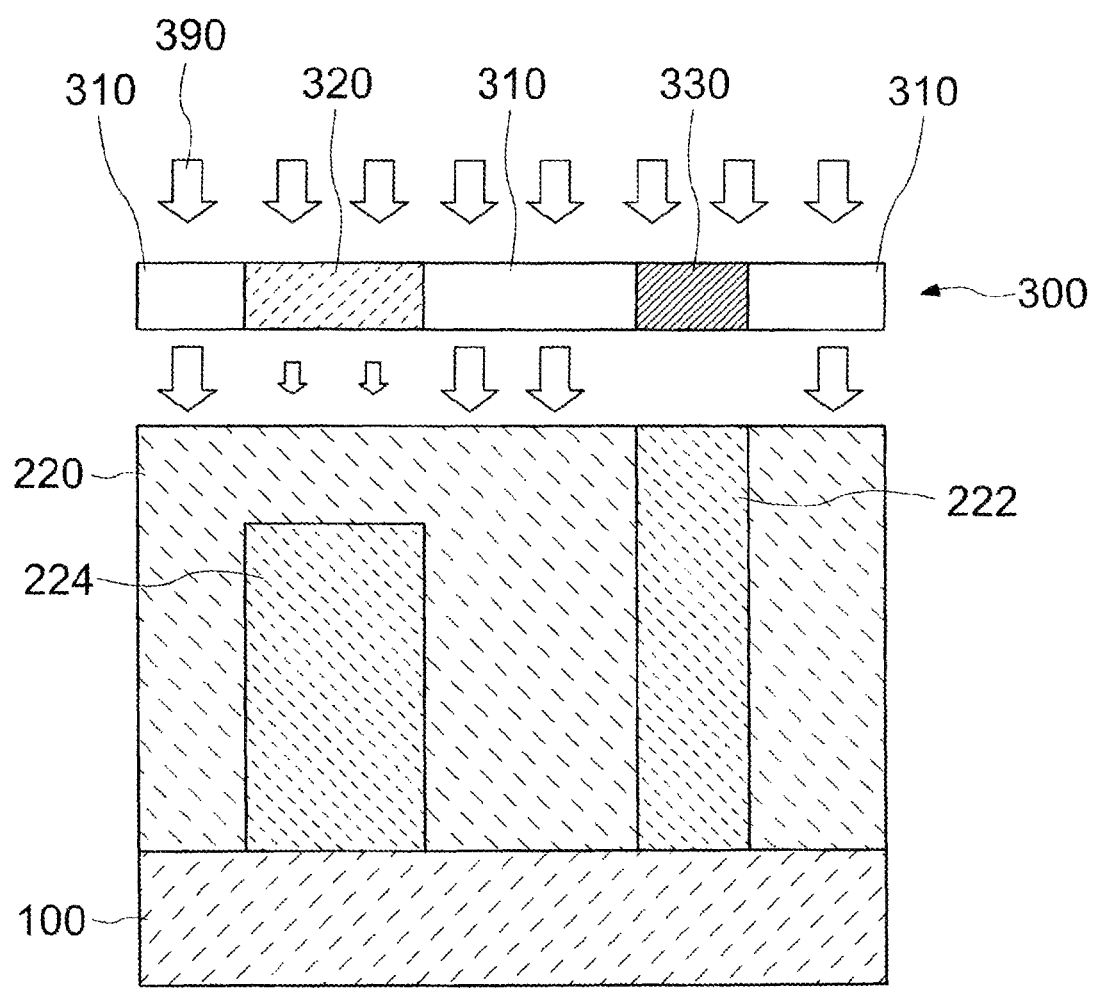
FIG. 5B is a cross-sectional view showing an exposure step of forming the spacer and the stepped portion in the method for producing the liquid crystal layer and the spacers in the liquid crystal display device in an embodiment according to the present invention.

FIG. 5B is a cross-sectional view showing an exposure step of forming the spacer 140 and the stepped portion 147 in the method for producing the liquid crystal layer 150 and the spacers 140 and 145 in the liquid crystal display device 30 in embodiment 1 according to the present invention. As shown in FIG. 5B, the photosensitive resin layer 220 is exposed to light by use of a multiple gray scale mask 300.

The multiple gray scale mask 300 includes a transmissive region 310 realizing normal exposure, a semi-transmissive region 320 realizing intermediate exposure, and a blocking region 330 preventing exposure. The "intermediate exposure" allows only a part of the light output from a light source of an exposure device to reach an exposure target.

The multiple gray scale mask 300 may be a gray tone mask or a half tone mask. The gray tone mask includes slits at a resolution lower than, or equal to, that of the exposure device. The slits block a part of the light to realize the intermediate exposure. The half tone mask includes a semi-transmissive film. The light is semi-transmitted to realize the intermediate exposure. Both of the masks form regions of three exposure levels, namely, an "exposed region", an "intermediate-exposed region" and an "unexposed region" by one cycle of exposure. Use of such a mask forms a photosensitive layer having a plurality of thicknesses after the development. The "intermediate exposure" realizes exposure of a plurality of gray levels by adjusting the amount of light to be transmitted, and thus may form "intermediate-exposed regions" of a plurality of exposure levels. Namely, one cycle of exposure forms a resin layer having three or more thicknesses.

As shown in FIG. 5B, when light 390 output from the light source of the exposure device is directed toward the multiple gray scale mask 300, the light 390 is not attenuated almost at all by the multiple gray scale mask 300 in the transmissive region 310 and reaches the photosensitive resin layer 220. Therefore, a region of the photosensitive resin layer 220 corresponding to the transmissive region 310 is changed to become easily soluble in the entirety of the thickness direction. In the light blocking region 330, the light 390 is blocked by the multiple gray scale mask 300 and does not reach the photosensitive resin layer 220. Therefore, a region of the photosensitive resin layer 220 corresponding to the light blocking region 330 is not changed to become easily soluble and remains poorly soluble. In the semi-transmissive region 320, the light 390 is attenuated by the multiple gray scale mask 300 and reaches the photosensitive resin layer 220. Therefore, a region of the photosensitive resin layer 220 corresponding to the semi-transmissive region 320 is changed to become easily soluble partially in the thickness direction. As a result, a poorly soluble portion 222 is formed in the region corresponding to the light blocking region 330, and a poorly soluble portion 224 is formed in the region corresponding to the semi-transmissive region 320. The poorly soluble portion 222 has a size in the thickness direction that is greater than that of the poorly soluble portion 224.

Figure 5C:
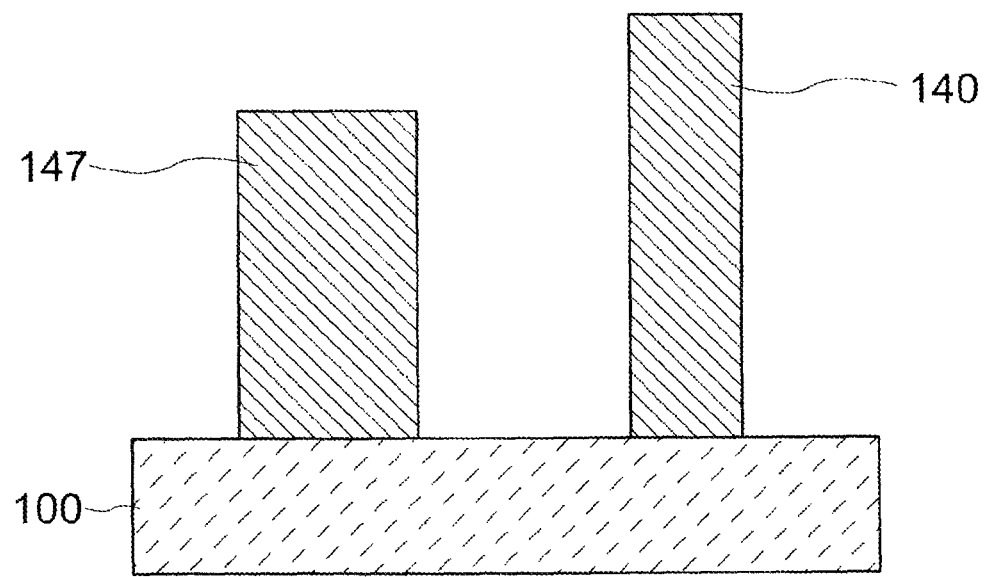
FIG. 5C is a cross-sectional view showing a step of forming the spacer and the stepped portion in the method for producing the liquid crystal layer and the spacers in the liquid crystal display device in an embodiment according to the present invention.

FIG. 5C is a cross-sectional view showing a step of forming the spacer 140 and the stepped portion 147 in the method for producing the liquid crystal layer 150 and the spacers 140 and 145 in the liquid crystal display device 30 in embodiment 1 according to the present invention. The array substrate 100 and the photosensitive resin layer 220 in the state shown in FIG. 5B is immersed in the developing solution to remove the photosensitive resin layer 220 except for the poorly soluble portions 222 and 224. As a result, the spacer 140 and the stepped portion 147 shown in FIG. 5C are formed. The poorly soluble portion 222 becomes the spacer 140, and the poorly soluble portion 224 becomes the stepped portion 147.

Figure 5D:
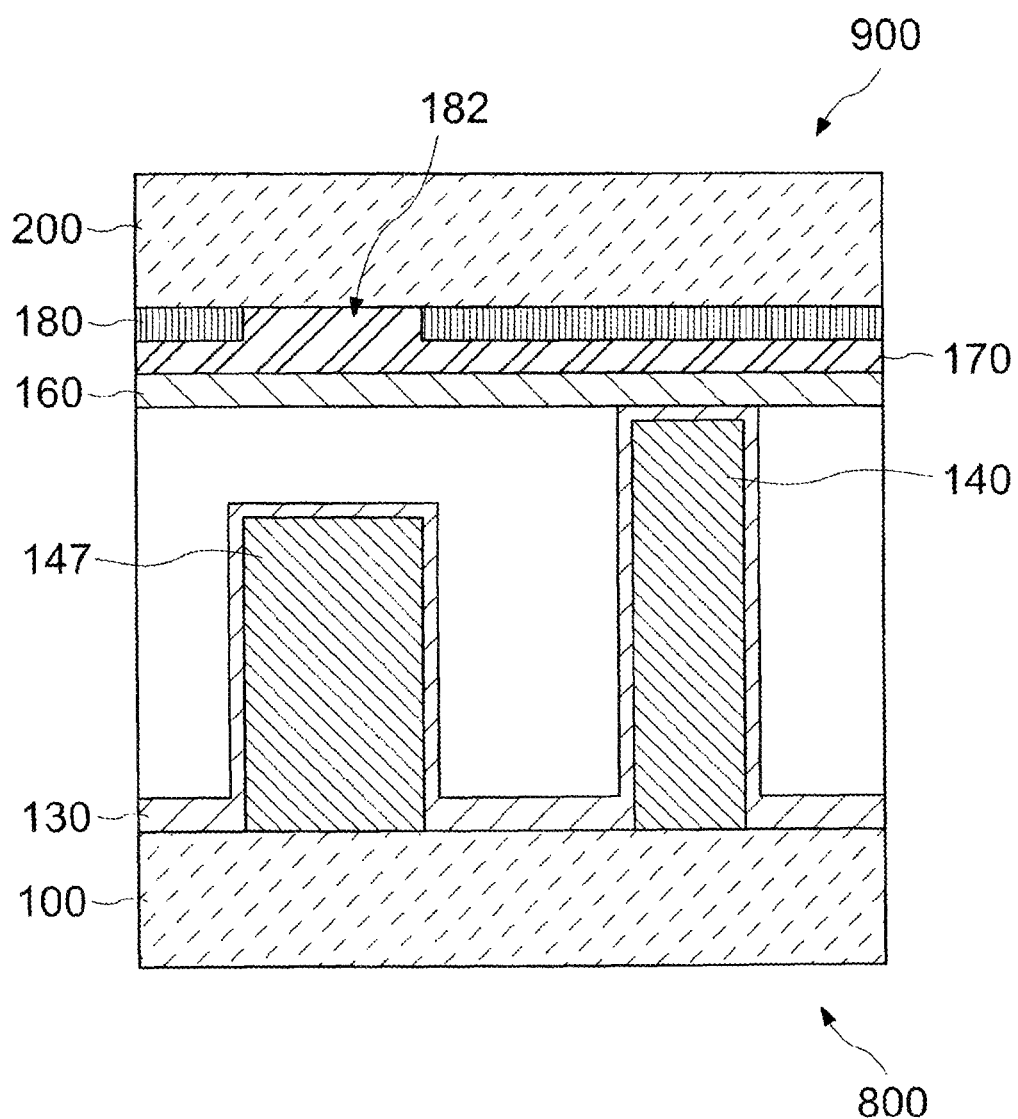
FIG. 5D is a cross-sectional view showing a step of bonding an array substrate and a counter substrate to each other in the method for producing the liquid crystal layer and the spacers in the liquid crystal display device in an embodiment according to the present invention.

FIG. 5D is a cross-sectional view showing a step of bonding the array substrate 100 and the counter substrate 200 to each other in the method for producing the liquid crystal layer 150 and the spacers 140 and 145 in the liquid crystal display device 30 in embodiment 1 according to the present invention. As shown in FIG. 5D, the alignment film 130 is formed on the array substrate 100, the spacer 140 and the stepped portion 147. The counter substrate 200 having the light-blocking layer 180, the overcoat film 170 and the alignment film 160 formed thereon is bonded to the array substrate 100 such that the counter substrate 200 and the array substrate 100 face each other. In other words, the first substrate 800 and the second substrate 900 are bonded together. The first substrate 800 and the second substrate 900 are bonded together with the sealing member 155 shown in FIG. 2. At the time of bonding, the spacer 140 restricts the first substrate 800 and the second substrate 900 from moving in a direction in which the first substrate 800 and the second substrate 900 become closer to each other. Namely, in the step of bonding, the protrusion (the spacer 140 and the alignment film 130 on the spacer 140) contacts the alignment film 160. The first substrate 800 and the second substrate 900 are bonded together in the state of being positioned such that the opening 182 and the stepped portion 147 overlap each other as seen in a plan view. In the state shown in FIG. 5D, a space enclosed by the first substrate 800, the second substrate 900 and the sealing member 155 is not completely sealed. An injection opening through which the liquid crystal material containing the liquid crystal molecules 152 and the monomer particles 154 is to be injected in a later step to form the liquid crystal layer 150 is formed in either the first substrate 800, the second substrate 900 or the sealing member 155.

Figure 5E:
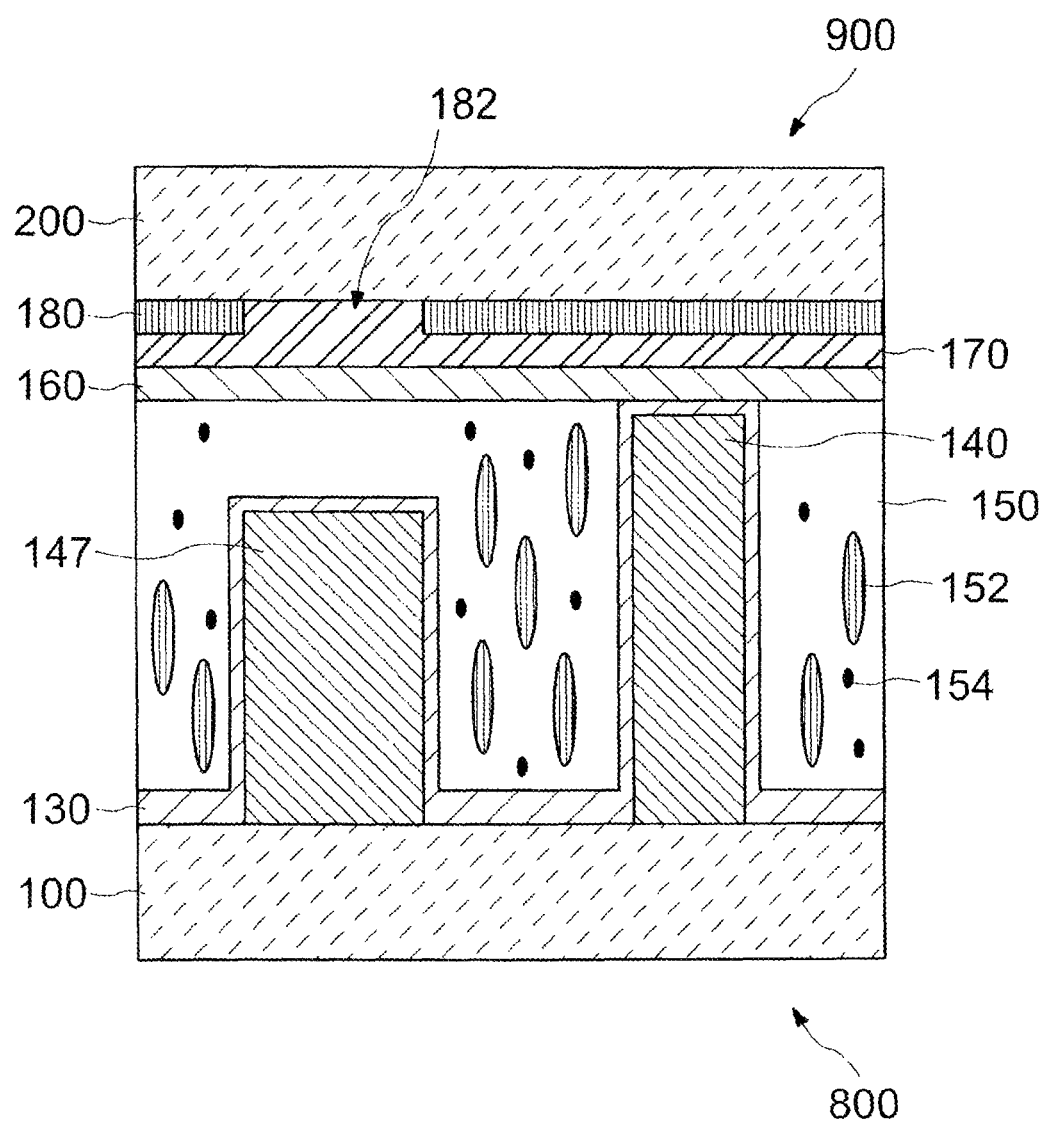
FIG. 5E is a cross-sectional view showing a step of injecting a liquid crystal material containing monomer particles in the method for producing the liquid crystal layer and the spacers in the liquid crystal display device in an embodiment according to the present invention.

FIG. 5E is a cross-sectional view showing a step of injecting the liquid crystal material containing the monomer particles 154 in the method for producing the liquid crystal layer 150 and the spacers 140 and 145 in the liquid crystal display device 30 in embodiment 1 according to the present invention. A mixed solution containing the liquid crystal molecules 152 and the monomer particles 154 is injected through the above-described injection opening to form the liquid crystal layer 150. After the mixed solution is injected and the liquid crystal layer 150 is formed, the injection opening is sealed. The temperature of the mixed solution is controlled to a level at which the liquid crystal molecules 152 exhibit an isotropic phase, in which the liquid crystal molecules 152 are aligned. In this embodiment, after the first substrate 800 and the second substrate 900 are bonded together, the mixed solution is injected through the injection opening to form the liquid crystal layer 150. The production method is not limited to this. For example, the space between the first substrate 800 and the second substrate 900 may be filled with the liquid crystal layer 150 by an ODF (One Drop Fill) method, as follows. Before the first substrate 800 and the second substrate 900 are bonded together, a mixed solution to be formed into the liquid crystal layer 150 is dropped on the first substrate 800 in a vacuum or reduced pressure atmosphere, and then the first substrate 800 and the second substrate 900 are bonded together.

Figure 5F:
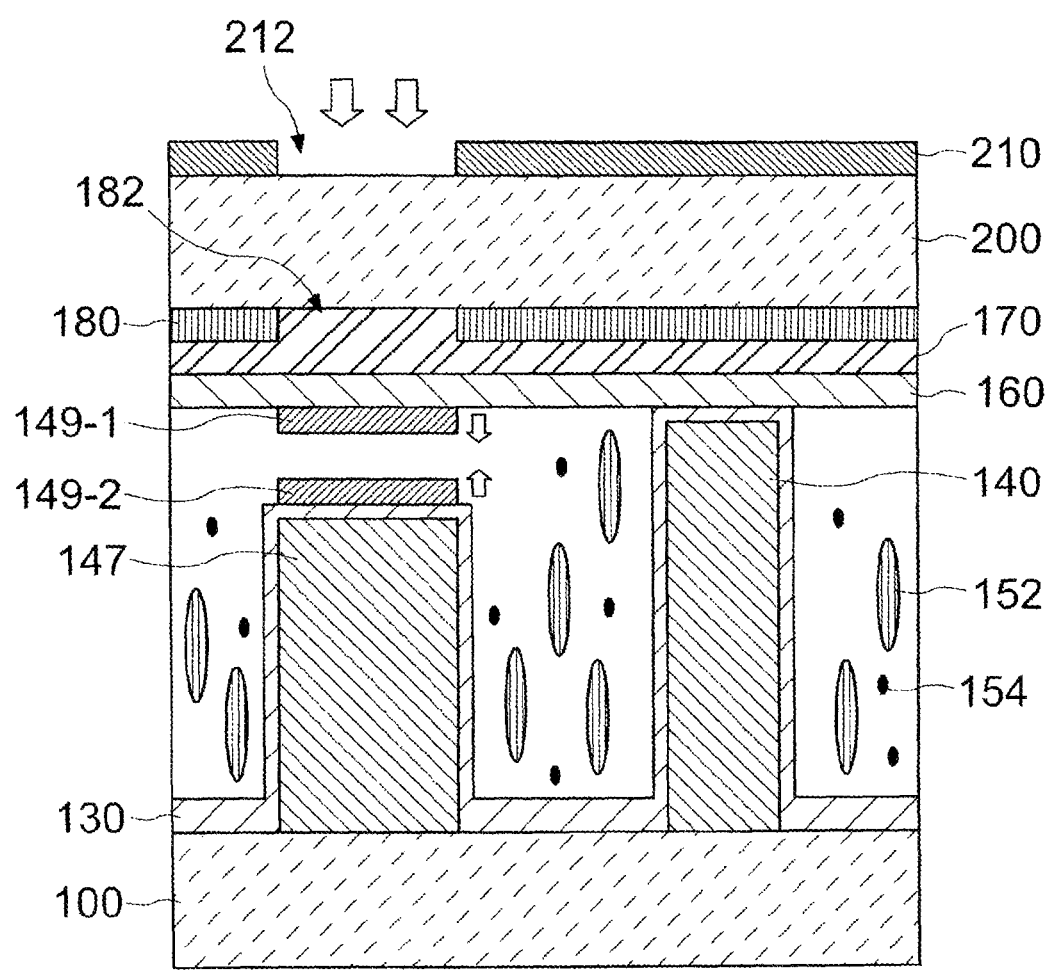
FIG. 5F is a cross-sectional view showing a step of polymerizing, on the stepped portion, the monomer particles in the liquid crystal layer by ultraviolet light in the method for producing the liquid crystal layer and the spacers in the liquid crystal display device in an embodiment according to the present invention.

FIG. 5F is a cross-sectional view showing a step of polymerizing, on the stepped portion 147, the monomer particles 154 in the liquid crystal layer 150 by ultraviolet light in the method for producing the liquid crystal layer 150 and the spacers 140 and 145 in the liquid crystal display device 30 in embodiment 1 according to the present invention. A mask 210 having an opening 212 in positional correspondence with the opening 182 is located above the counter substrate 200, namely, on the side opposite to the alignment film 160 with respect to the counter substrate 200. The mask 210 may be located in contact with the counter substrate 200. Ultraviolet light is directed from above the mask 210. The ultraviolet light passes the openings 212 and 182 and is directed toward a part of the liquid crystal layer 150 that is above the stepped portion 147. When the liquid crystal layer 150 is irradiated with the ultraviolet light, the monomer particles 154 in this part of the liquid crystal layer 150 are cured by the ultraviolet light and changed to the polymer portion 149. The monomer particles 154 start cured from a region that is in contact with the alignment film 160 or a part of the alignment 130 that is located on the top surface of the stepped portion 147. As a result, a polymer portion 149-1 grows from the side of the alignment film 160, and a polymer portion 149-2 grows from the side of the stepped portion 147. The ultraviolet light is kept directed until the polymer portion 149-1 and the polymer portion 149-2 contact each other. As a result, the liquid crystal display device 30 shown in FIG. 4 is formed. The light source for directing the ultraviolet light may be a light source using a collimator lens and outputting highly parallel ultraviolet light.

As described above, according to the method for producing the liquid crystal display device 30 in embodiment 1, the polymer portion 149 merely needs to be formed between the alignment film 160 and the part of the alignment film 130 that is located on the top surface of the stepped portion 147. Therefore, the time required to cure the monomer particles 154 by ultraviolet light is shortened. Since the height of the polymer portion 149 to be formed is sufficiently smaller than that of the spacer 140, the amount of the monomer particles 154 required to form the polymer portion 149 is decreased. As a result, the amount of the monomer particles 154 remaining in the liquid crystal layer 150 after the formation of the polymer portion 149 is decreased.

Embodiment 2

Figure 6:
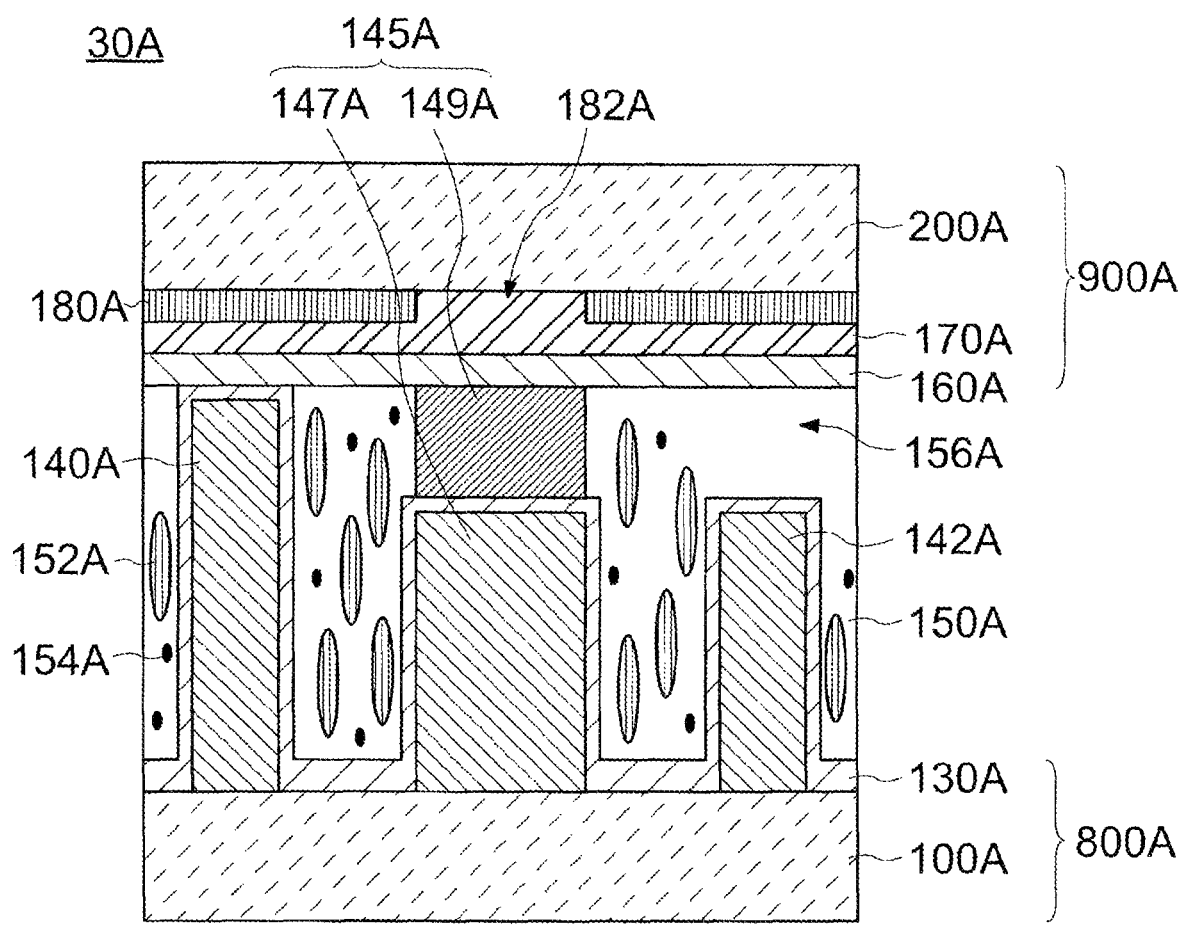
FIG. 6 is a cross-sectional view showing structures of a liquid crystal layer and spacers in a liquid crystal display device in an embodiment according to the present invention.

With reference to FIG. 6, an overview of a liquid crystal display device in an embodiment according to the present invention will be described. A liquid crystal display device 30A in a liquid crystal module 10A in embodiment 2 is similar to the liquid crystal display device 30 in embodiment 1. Unlike the liquid crystal display device 30 in embodiment 1, the liquid crystal display device 30A includes two types of spacers 140A and 145A and also a sub spacer 142A lower than the spacers 140A and 145A. In the liquid crystal module 10A in embodiment 2, a first polarizer plate 20A, a second polarizer plate 40A, and a backlight unit 50A are the same as the first polarizer plate 20, the second polarizer plate 40, and the backlight unit 50 in the liquid crystal module 10 in embodiment 1, and thus will not be described. A first substrate 800A and a second substrate 900A in the liquid crystal display device 30A in embodiment 2 have the same structures as those of the first substrate 800 and the second substrate 900 in the liquid crystal display device 30 in embodiment 1, and thus will not be described. In the following, the above-described differences of embodiment 2 from embodiment 1 will be described.

[Structures of the Spacers 140A and 145A and the Sub Spacer 142A]

With reference to FIG. 6, the structure of each of the spacer 140A, the spacer 145A and the sub spacer 142A will be described in detail. FIG. 6 is a cross-sectional view showing the structures of a liquid crystal layer 150A, the spacer 140A, the spacer 145A and the sub spacer 142A in the liquid crystal display device 30A in embodiment 2 according to the present invention. Like FIG. 4, FIG. 6 omits the components located between an array substrate 100A and an alignment film 130A for the sake of simple description. The following description will be given with reference to FIG. 6.

As shown in FIG. 6, the liquid crystal layer 150A, the spacer 140A, the spacer 145A and the sub spacer 142A are located between the first substrate 800A and the second substrate 900A. The sub spacer 142A is a protrusion located in the first substrate 800A and protruding toward the second substrate 900A. A part of the alignment film 130A goes beyond the sub spacer 142A. In other words, a part of the alignment film 130A is located on a side surface and a top surface of the sub spacer 142A. The sub spacer 142A and a part of the alignment film 130A going beyond the sub spacer 142A may be collectively referred to as a "protrusion". The sub spacer 142A is lower than the spacers 140A and 145A. In other words, the spacers 140A and 145A are greater than the sub spacer 142A in the length from the first substrate 800A. A gap 156A is provided between the sub spacer 142A and an alignment film 160A. In other words, the gap 156A is provided between the sub spacer 142A and the second substrate 900A. Namely, the sub spacer 142A is not in contact with the alignment film 160A, and the liquid crystal layer 150A is present between the sub spacer 142A and the alignment film 160A. The sub spacer 142A is as high as a stepped portion 147A of the spacer 145A. The sub spacer 142A merely needs to be lower than the spacers 140A and 145A, and may be lower than the stepped portion 147A, or may be higher than the stepped portion 147A.

The sub spacer 142A may be formed in the same step as the spacers 140A and 145A. In other words, the sub spacer 142A is in the same layer as, and is formed of the same material as, the spacer 140A and the stepped portion 147A of the spacer 145A. In still other words, the spacer 140A, the spacer 145A and the sub spacer 142A are in contact with an underlying layer continued from areas below the spacers 140A and 140A to an area below the sub spacer 142A. In the example of FIG. 6, the underlying layer is the insulating layer 130A.

In the case where the locating density of the spacers 140A and 145A (number of the spacers per unit area size) is increased in order to improve the load-bearing characteristic of the liquid crystal display device 30A, when the ambient temperature is decreased and the liquid crystal layer 150A contracts, the distance between the first substrate 800A and the second substrate 900A (cell gap) may not follow the contraction of the liquid crystal layer 150A. If the cell gap does not follow the contraction of the liquid crystal layer 150A, air bubbles may be generated in the liquid crystal layer 150A. In the region in the liquid crystal layer 150A where the sub spacer 142A is located, the cell gap is decreased along with the contraction of the liquid crystal layer 150A, but the cell gap does not become smaller than the height of the sub spacer 142A. As can be seen from the above, in the liquid crystal display device 30A in embodiment 2, the sub spacer 142A is provided in addition to the spacers 140A and 145A, so that generation of air bubbles is suppressed while the load-bearing characteristic of the liquid crystal display device 30A is improved.

Embodiment 3

Figure 7:
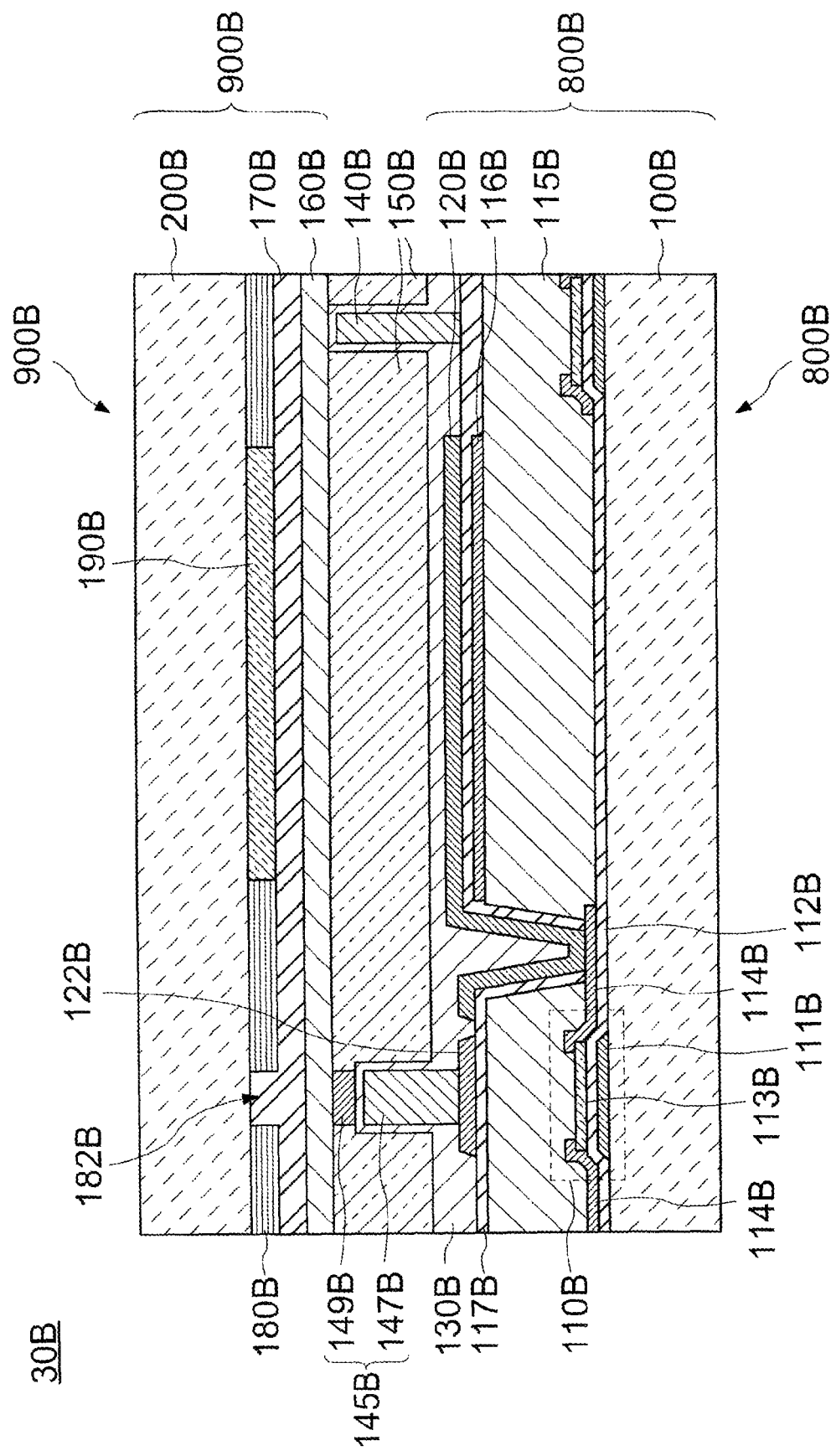
FIG. 7 is a cross-sectional view showing an overall structure of a liquid crystal display device in an embodiment according to the present invention.

With reference to FIG. 7, an overview of a liquid crystal display device in an embodiment according to the present invention will be described. A liquid crystal display device 30B in a liquid crystal module 10B in embodiment 3 is similar to the liquid crystal display device 30 in embodiment 1. Unlike the liquid crystal display device 30 in embodiment 1, the liquid crystal display device 30B includes a light-blocking pattern 122B between a transistor 110B and a liquid crystal layer 150B. In the liquid crystal module 10B in embodiment 3, a first polarizer plate 20B, a second polarizer plate 40B, and a backlight unit 50B are the same as the first polarizer plate 20, the second polarizer plate 40, and the backlight unit 50 in the liquid crystal module 10 in embodiment 1, and thus will not be described. A second substrate 900B and spacers 140B and 145B in the liquid crystal display device 30B in embodiment 3 have the same structures as those of the second substrate 900 and the spacers 140 and 145 in the liquid crystal display device 30 in embodiment 1, and thus will not be described. In the following, the above-described differences of embodiment 3 from embodiment 1 will be described.

[Cross-Sectional View of the Liquid Crystal Display Device 30B]

FIG. 7 is a cross-sectional view showing an overall structure of the liquid crystal display device 30B in embodiment 3 according to the present invention. As shown in FIG. 7, in the liquid crystal display device 30B, the light-blocking pattern 122B is located above the transistor 110B and below the spacer 145B. In other words, the light-blocking pattern 122B is located between the transistor 110B and the liquid crystal layer 150B. The light-blocking pattern 122B is located in a first substrate 800B. The light-blocking pattern 122B overlaps the transistor 110B, the spacer 145B and an opening 182B as seen in a plan view. The light-blocking pattern 122B blocks ultraviolet light. The light-blocking pattern 122B does not need to completely block ultraviolet light. The light-blocking pattern 122B merely needs to absorb, scatter or reflect ultraviolet light that passes the opening 182B and is directed toward a stepped portion 147B so as to decrease the intensity of the ultraviolet light reaching the transistor 110B.

In the example of FIG. 7, the light-blocking pattern 122B is located between an insulating layer 117B and an alignment film 130B. The liquid crystal display device 30B is not limited to having such a structure. The light-blocking pattern 122B may be located at any position between a semiconductor layer 113B of the transistor 110B and the stepped portion 147B.

As described above, the light-blocking pattern 122B merely needs to absorb, scatter or reflect the ultraviolet light, and may be formed of, for example, a black resin, a metal material or the like. The light-blocking pattern 122B merely needs to have a low transmittance for ultraviolet light, and therefore may be formed of a conductive film that absorbs, scatters or reflects ultraviolet light and transmits visible light. For example, in the structure shown in FIG. 7, the light-blocking pattern 122B may be formed in the same layer as a pixel electrode 120B. In the example of FIG. 7, the light-blocking pattern 122B is separated from the pixel electrode 120B. In the case where the light-blocking pattern 122B is formed in the same layer as the pixel electrode 120B, the light-blocking pattern 122B and the pixel electrode 120B may be continuous from each other.

As described above, in the liquid crystal display device 30B in embodiment 3, the light-blocking pattern 122B is located above the transistor 110B. Therefore, when the ultraviolet light passes the opening 182B and is directed toward the stepped portion 147B, the ultraviolet light is attenuated or blocked by the light-blocking pattern 122B. Thus, the ultraviolet light is suppressed from reaching the transistor 110B, and damage on the transistor 110B by the ultraviolet light is alleviated.

Embodiment 4

Figure 8:
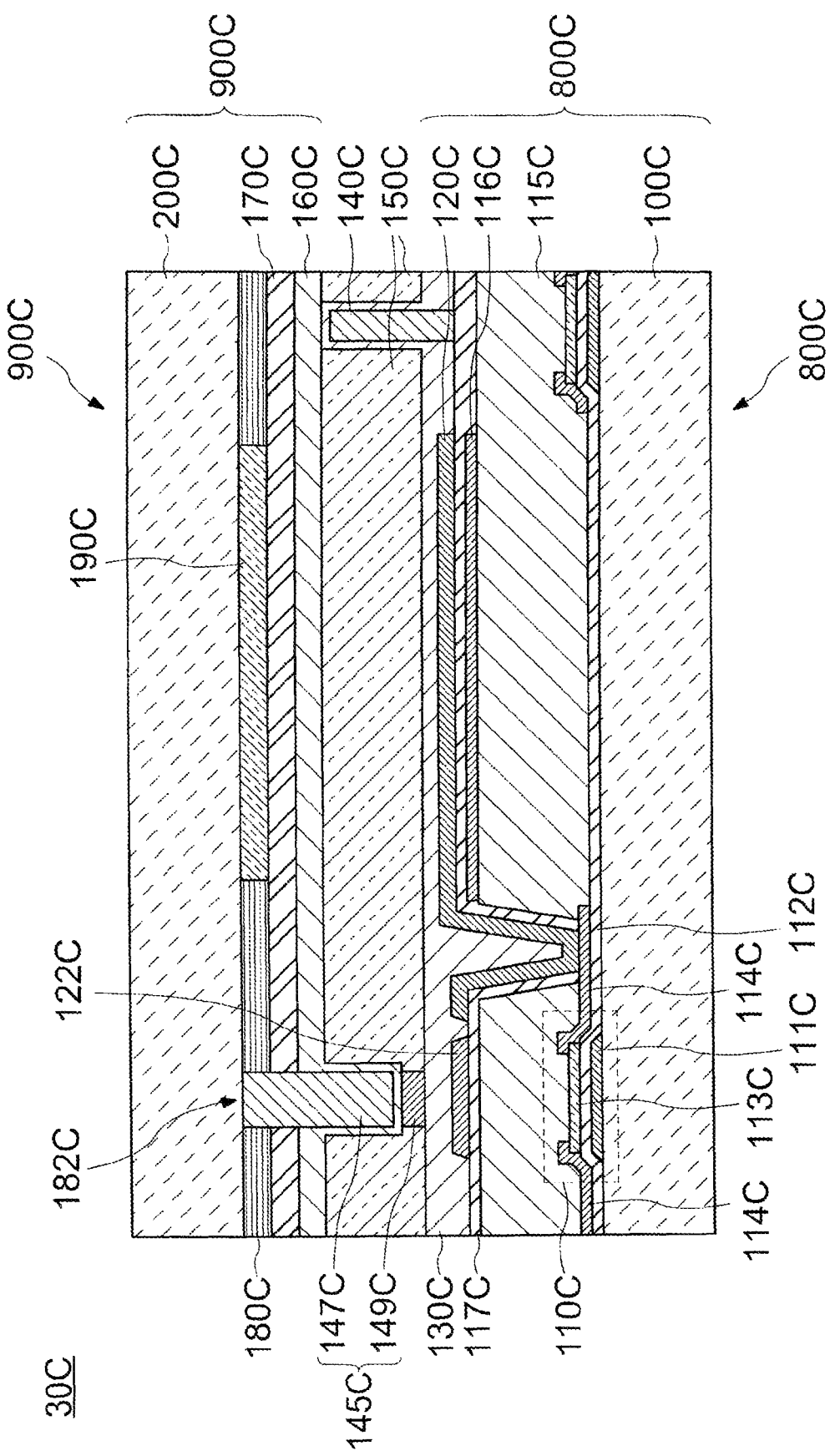
FIG. 8 is a cross-sectional view showing an overall structure of a liquid crystal display device in an embodiment according to the present invention.
Figure 9:
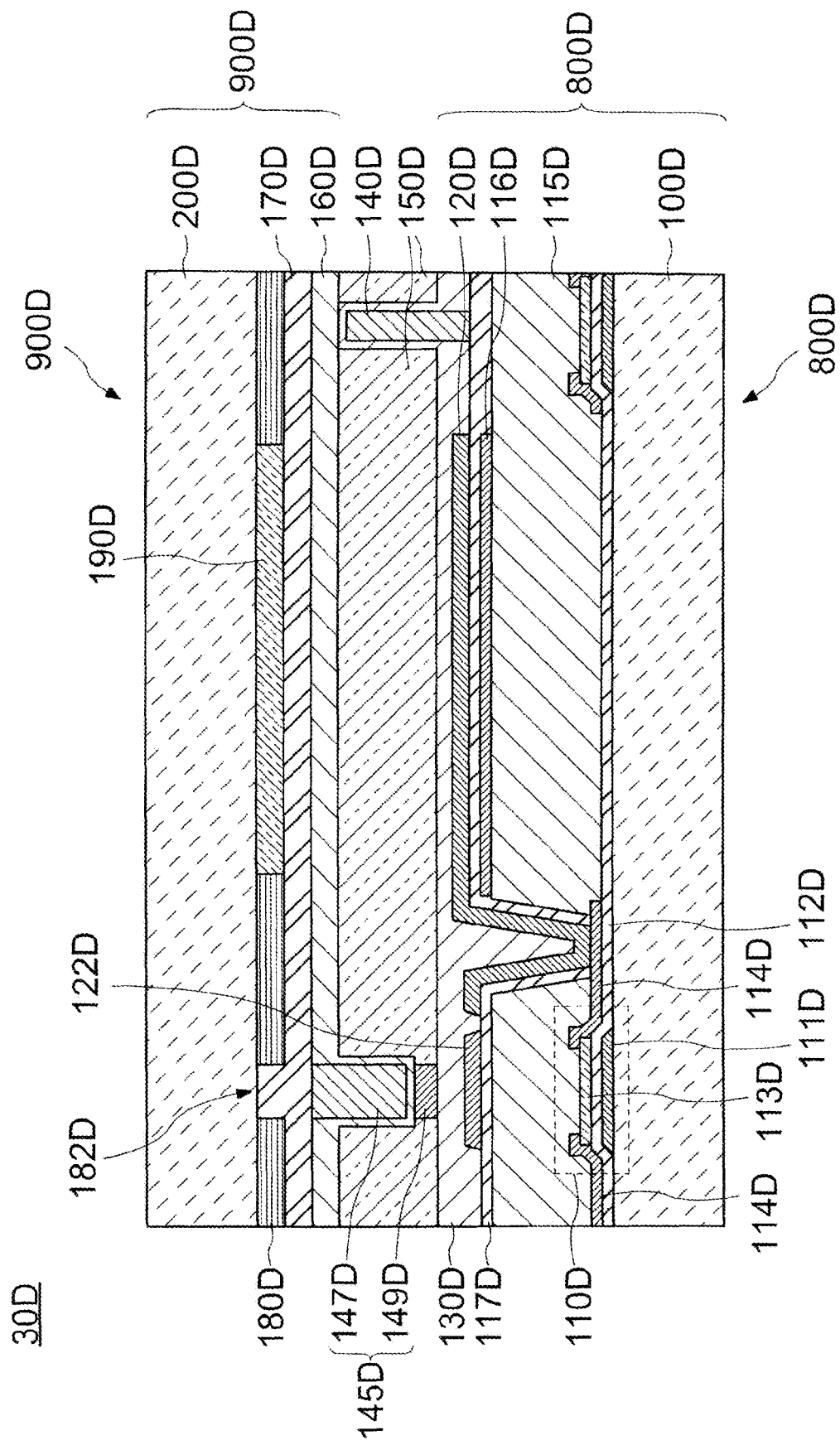
FIG. 9 is a cross-sectional view showing an overall structure of a liquid crystal display device in an embodiment according to the present invention.
Figure 10:
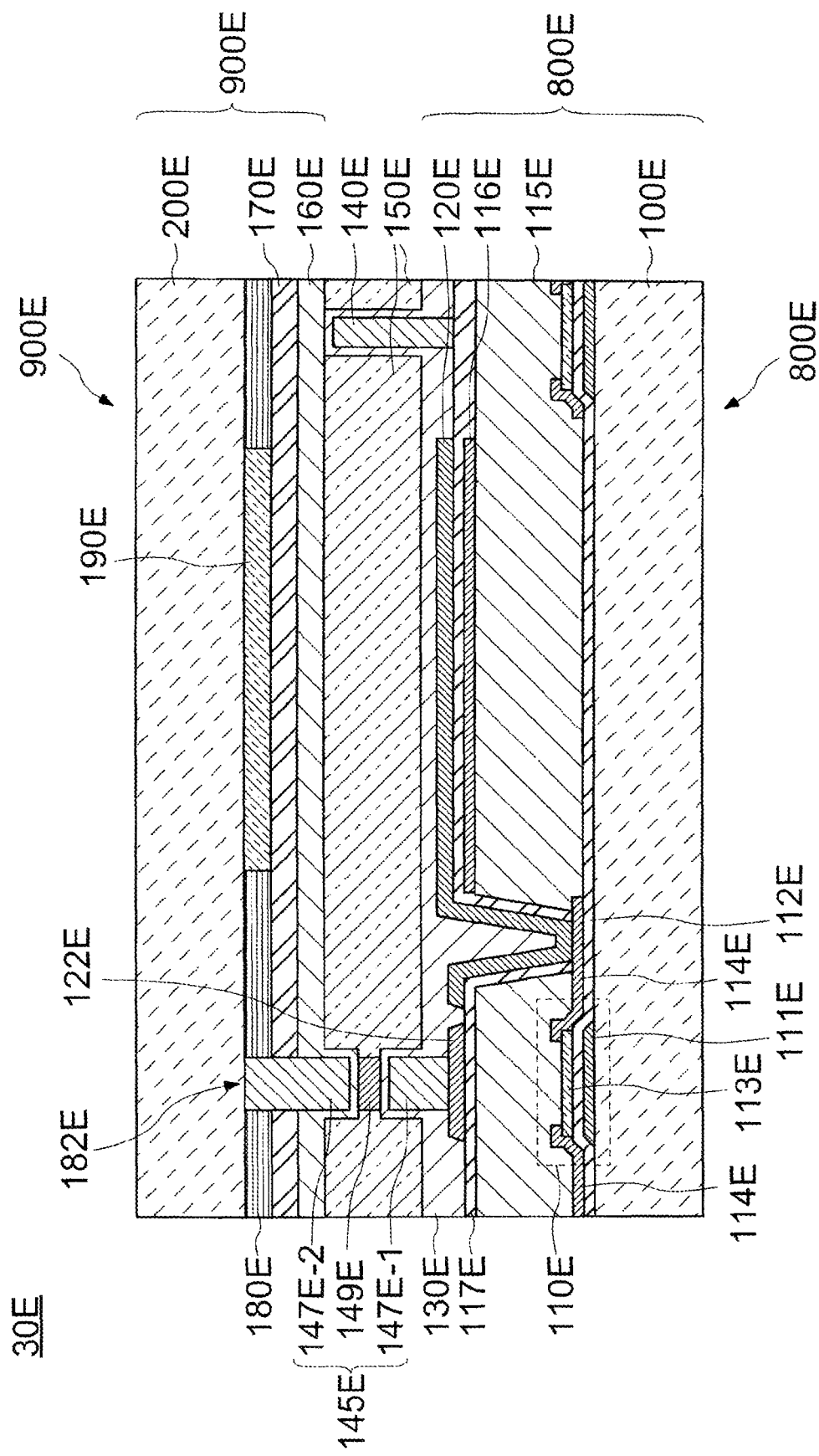
FIG. 10 is a cross-sectional view showing an overall structure of a liquid crystal display device in an embodiment according to the present invention.

With reference to FIG. 8 to FIG. 10, an overview of a liquid crystal display device in an embodiment according to the present invention will be described. Liquid crystal display devices 30C to 30E in liquid crystal modules 100 to 10E in embodiment 4 are similar to the liquid crystal display device 30B in embodiment 3. Stepped portions 147C to 147E and polymer portions 149C to 149E in the liquid crystal display devices 30C to 30E have different structures from those of the stepped portion 147B and a polymer portion 149B in the liquid crystal display device 30B. In the liquid crystal modules 100 to 10E in embodiment 4, first polarizer plates 20C to 20E, second polarizer plates 40C to 40E, and backlight units 50C to 50E are the same as the first polarizer plate 20, the second polarizer plate 40, and the backlight unit 50 in the liquid crystal module 10 in embodiment 1, and thus will not be described. First substrate 800C to 800E in the liquid crystal display devices 30C to 30E in embodiment 4 have the same structures as that of the first substrate 800B in the liquid crystal display device 30B in embodiment 3, and thus will not be described. In the following, the above-described differences of embodiment 4 from embodiment 3 will be described.

[Cross-Sectional View of the Liquid Crystal Display Device 30C]

FIG. 8 is a cross-sectional view showing an overall structure of the liquid crystal display device 30C in embodiment 4 according to the present invention. As shown in FIG. 8, in the liquid crystal display device 30C, a spacer 145C is located below a counter substrate 200C and protrudes from the counter substrate 200C toward an array substrate 100C. Specifically, the stepped portion 147C is located below the counter substrate 200C. The polymer portion 149C is located below an alignment film 160C, which is located on a bottom surface of the stepped portion 147C. The polymer portion 149C is in contact with an alignment film 130C. The above-described structure may be expressed as follows. The spacer 145C is located in a second substrate 900C and protrudes from the second substrate 900C toward the first substrate 800C. A spacer 140C is located in the first substrate 800C and protrudes from the first substrate 800C toward the second substrate 900C, like the spacer 140B in the liquid crystal display device 30B shown in FIG. 7. In the structure shown in FIG. 8, ultraviolet light passes the stepped portion 147C in the step of forming the polymer portion 149C. Therefore, it is preferable that the stepped portion 147C is formed of a material having a high transmittance for ultraviolet light.

In the example of FIG. 7, the stepped portion 147B is lower than the spacer 140B. In the example of FIG. 8, the stepped portion 147C may be higher than, as high as, or lower than, the spacer 140C. The spacer 145C is provided in an opening 182C in a light-blocking layer 180C.

The spacer 145C is bonded to both of the counter substrate 200C and the alignment film 130C. In other words, the spacer 145C is bonded to both of the second substrate 900C and the first substrate 800C. Specifically, the stepped portion 147C is bonded to the counter substrate 200C. The polymer portion 149C is bonded to the alignment film 130C. The stepped portion 147C and the polymer portion 149C are bonded to each other while having the alignment film 160C therebetween.

[Cross-Sectional View of the Liquid Crystal Display Device 30D]

FIG. 9 is a cross-sectional view showing an overall structure of the liquid crystal display device 30D in embodiment 4 according to the present invention. The liquid crystal display device 30D shown in FIG. 9 is similar to the liquid crystal display device 30C shown in FIG. 8. Unlike in the liquid crystal display device 30C, in the liquid crystal display device 30D, a spacer 145D is located below an overcoat film 170D and protrudes from overcoat film 170D toward an alignment film 130D. In the liquid crystal display device 30D, the stepped portion 147D is located below the overcoat film 170D. The polymer portion 149D is located below the stepped portion 147D while an alignment film 160D being provided between the polymer portion 149D and the stepped portion 147D. The polymer portion 149D is in contact with the alignment film 130D. In other words, the spacer 145D is located in a second substrate 900D and protrudes from the second substrate 900D toward the first substrate 800D. The stepped portion 147D in FIG. 9 is lower than the spacer 140D. The spacer 145D overlaps an opening 182D as seen in a plan view.

The spacer 145D is bonded to both of the overcoat film 170D and the alignment film 130D. In other words, the spacer 145D is bonded to both of the second substrate 900D and the first substrate 800D. Specifically, the stepped portion 147D is bonded to the overcoat film 170D. The polymer portion 149D is bonded to the alignment film 130D. The stepped portion 147D and the polymer portion 149D are bonded to each other while having the alignment film 160D therebetween.

[Cross-Sectional View of the Liquid Crystal Display Device 30E]

FIG. 10 is a cross-sectional view showing an overall structure of the liquid crystal display device 30E in embodiment 4 according to the present invention. The liquid crystal display device 30E shown in FIG. 10 is similar to the liquid crystal display device 30C shown in FIG. 8. Unlike in the liquid crystal display device 30C, in the liquid crystal display device 30E, a spacer 145E includes a first stepped portion 147E-1, a second stepped portion 147E-2 and the polymer portion 149E, and the polymer portion 149E is located between the first stepped portion 145E-1 and the second stepped portion 145E-2. In the liquid crystal display device 30E, the first stepped portion 147E-1 is located above a light-blocking pattern 122E. The second stepped portion 147E-2 is located below a counter substrate 200E. The first stepped portion 147E-1 may be located above an alignment film 130E. Similarly, the second stepped portion 147E-2 may be located below an alignment film 160E.

The spacer 145E is bonded to both of the counter substrate 200E and the light-blocking pattern 122E. In other words, the spacer 145E is bonded to both of a second substrate 900E and the first substrate 800E. Specifically, the first stepped portion 147E-1 is bonded to the light-blocking pattern 122E. The second stepped portion 147E-2 is bonded to the counter substrate 200E. The polymer portion 149E is bonded to the first stepped portion 147E-1 with the alignment film 130E being provided between the polymer portion 149E and the first stepped portion 147E-1, and is bonded to the second stepped portion 147E-2 with the alignment film 160E being provided between the polymer portion 149E and the second stepped portion 147E-2.

In the example of FIG. 10, the first stepped portion 147E-1, the second stepped portion 147E-2 and the polymer portion 149E are located at the same position as seen in a plan view (namely, the first second stepped portion 147E-1, the second stepped portion 147E-2 and the polymer portion 149E have the same planar pattern). The liquid crystal display device 30E is not limited to having such a structure. In the liquid crystal display device 30E shown in FIG. 10, after the first substrate 800E having the first stepped portion 147E-1 formed therein and the second substrate 900E having the second stepped portion 147E-2 formed therein are bonded together, ultraviolet light is directed to form the polymer portion 149E. Therefore, in the step of bonding the first substrate 800E and the second substrate 900E to each other, the first stepped portion 147E-1 and the second stepped portion 147E-2 may be positionally shifted as seen in a plan view due to the positioning precision of the substrates 800 and 900. Namely, the first stepped portion 147E-1 and the second stepped portion 147E-2 merely need to overlap each other as seen in a plan view, and do not have exactly the same planar pattern as each other.

In the examples of FIG. 8 to FIG. 10, like in the example of FIG. 7, the light-blocking patterns 122C to 122E are located between transistors 110C to 110E and the spacers 145C to 145E. The liquid crystal display devices 30C to 30E are not limited to having such a structure. As long as the ultraviolet light directed to form the polymer portions 149C to 149E does not adversely influence the transistors 110C to 110E, the light-blocking patterns 122C to 122E may be omitted.

As described above, in the liquid crystal display devices 30C to 30E in embodiment 4, the spacers 145C to 145E are located in the second substrates 900C to 900E. In addition, the first stepped portion 147E-1 is formed in the first substrate 800E and the second stepped portion 147E-2 is formed in the second substrate 900E, so that the polymer portion 149E is made lower. As a result, the time required to form the polymer portion 149E is further shortened. In addition, the amount of monomer particles 154E required to form the polymer portion 149E is decreased.

Embodiment 5

Figure 11:
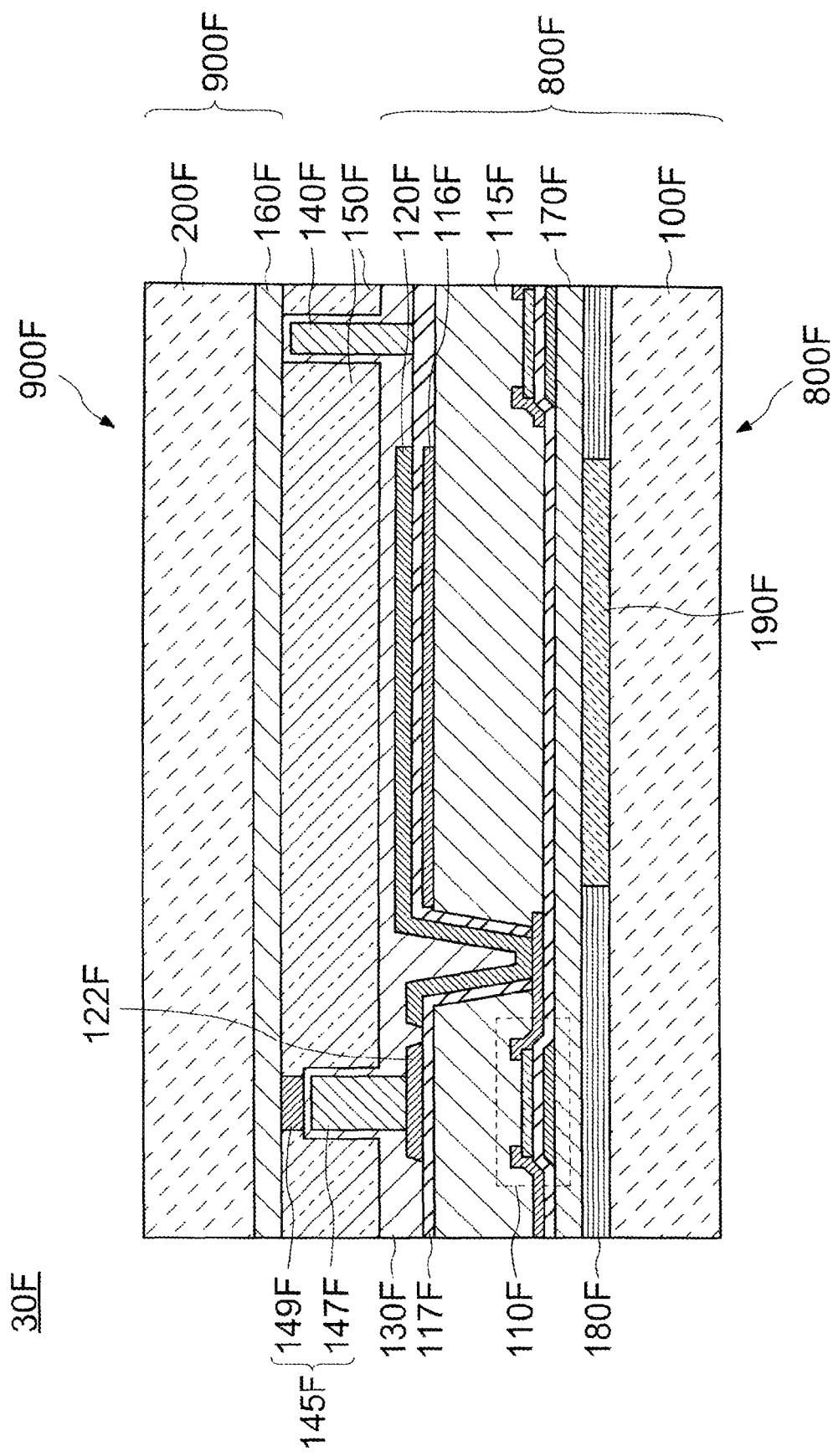
FIG. 11 is a cross-sectional view showing an overall structure of a liquid crystal display device in an embodiment according to the present invention.

With reference to FIG. 11, an overview of a liquid crystal display device in an embodiment according to the present invention will be described. A liquid crystal display device 30F in a liquid crystal module 10F in embodiment 5 is similar to the liquid crystal display device 30B in embodiment 3. Unlike in the liquid crystal display device 30B in embodiment 3, in the liquid crystal display device 30F, none of a color filter 190F, a light-blocking layer 180F and an overcoat film 170F is located between a counter substrate 200F and an alignment film 160F. The color filter 190F, the light-blocking layer 180F and the overcoat film 170F are located between an array substrate 100F and a transistor 110F. In the liquid crystal module 10F in embodiment 5, a first polarizer plate 20F, a second polarizer plate 40F, and a backlight unit 50F are the same as the first polarizer plate 20, the second polarizer plate 40, and the backlight unit 50 in the liquid crystal module 10 in embodiment 1, and thus will not be described. Spacers 140F and 145F in the liquid crystal display device 30F in embodiment 5 have the same structures as those of the spacers 140 and 145 in the liquid crystal display device 30 in embodiment 1, and thus will not be described. In the following, the above-described differences of embodiment 5 from embodiment 3 will be described.

[Cross-Sectional View of the Liquid Crystal Display Device 30F]

FIG. 11 is a cross-sectional view showing an overall structure of the liquid crystal display device 30F in embodiment 5 according to the present invention. As shown in FIG. 11, in the liquid crystal display device 30F, the color filter 190F and the light-blocking layer 180F are located on the array substrate 100F. The overcoat film 170F is located on the color filter 190F and the light-blocking layer 180F. The transistor 110F is located on the overcoat film 170F. Namely, the color filter 190F, the light-blocking layer 180F and the overcoat film 170F are included in a first substrate 800F. An alignment film 160F is located below the counter substrate 200F. Neither the color filter nor the light-blocking layer is located between the counter substrate 200F and the alignment film 160F. When necessary, a light-blocking layer may be located between the counter substrate 200F and the alignment film 160F.

In the liquid crystal display device 30F, the backlight unit 50F is located on the side of the second substrate 900F. Namely, an image is displayed on the side opposite to a liquid crystal layer 150F with respect to the first substrate 800F. Alternatively, the backlight unit 50F may be located on the side of the first substrate 800F.

As shown in FIG. 11, the light-blocking layer 180F is located closer to the array substrate 100F than the liquid crystal layer 150F. For forming a polymer portion 149F above a stepped portion 147F, ultraviolet light is directed from the counter substrate 200F. In the structure of the liquid crystal display device 100F shown in FIG. 11, no ultraviolet light-blocking component (e.g., component such as the light-blocking layer 180B shown in FIG. 7) is provided between the stepped portion 147F and the counter substrate 200F. Therefore, the polymer portion 149F is formed in a region irradiated with the ultraviolet light output from the counter substrate 200F.

The heat treatment temperature in the method for forming the components provided on the array substrate 100F, for example, the transistor 110F and the like, is preferably a temperature lower than, or equal to, the heat resistant temperature of the color filter 190F and the light-blocking layer 180F. For example, a semiconductor layer of the transistor 110F may be formed of an oxide semiconductor material or amorphous silicon.

As described above, in the liquid crystal display device 30F in embodiment 5, after the first substrate 800F and the second substrate 900F are bonded together, the ultraviolet light is directed toward only a region where the polymer portion 149F is to be formed. This enlarges the positioning precision margin for the step of bonding the first substrate 800F and the second substrate 900F.

Embodiment 6

Figure 12:
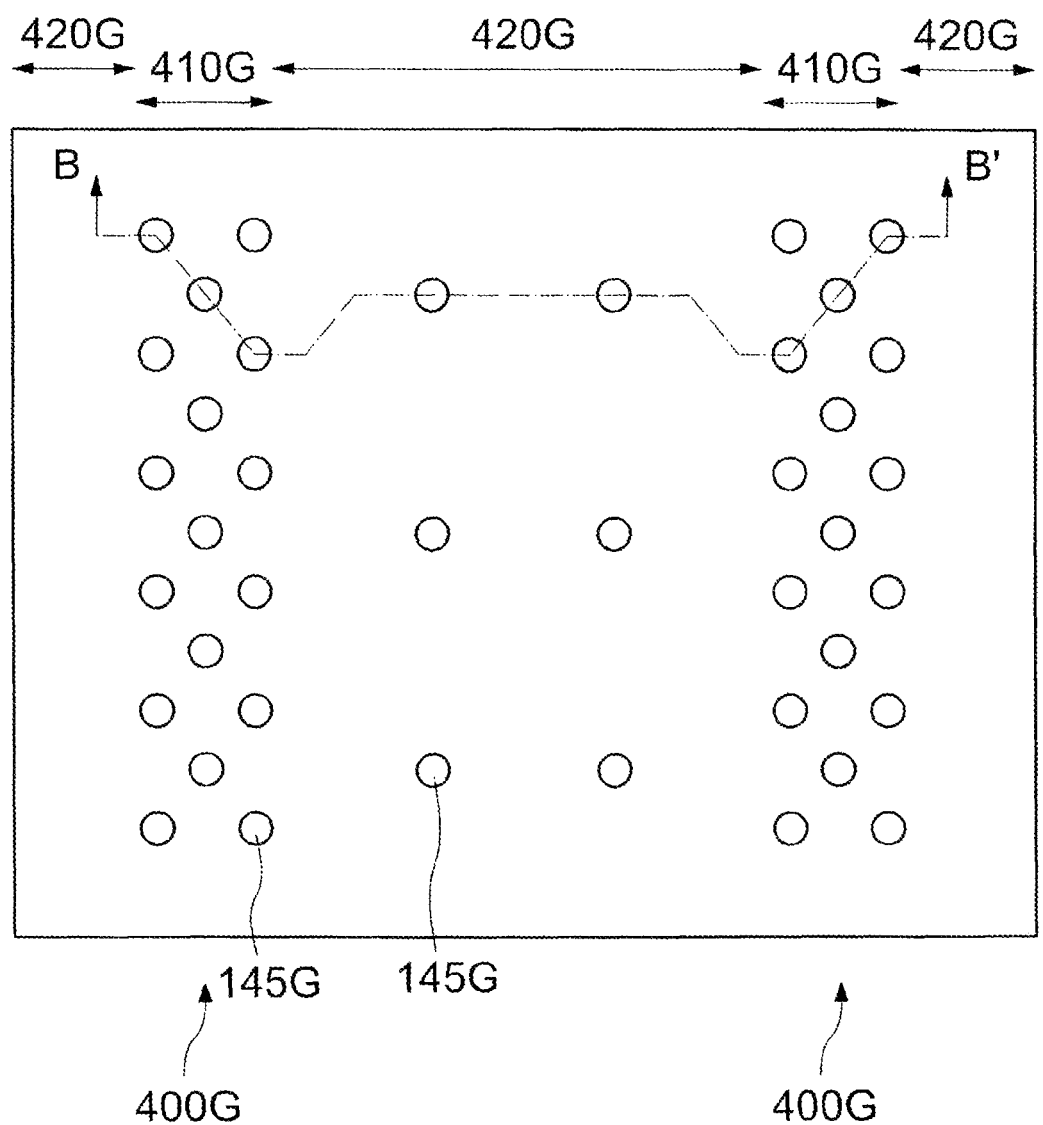
FIG. 12 is a plan view showing the layout of spacers in a liquid crystal display device in an embodiment according to the present invention.
Figure 13:
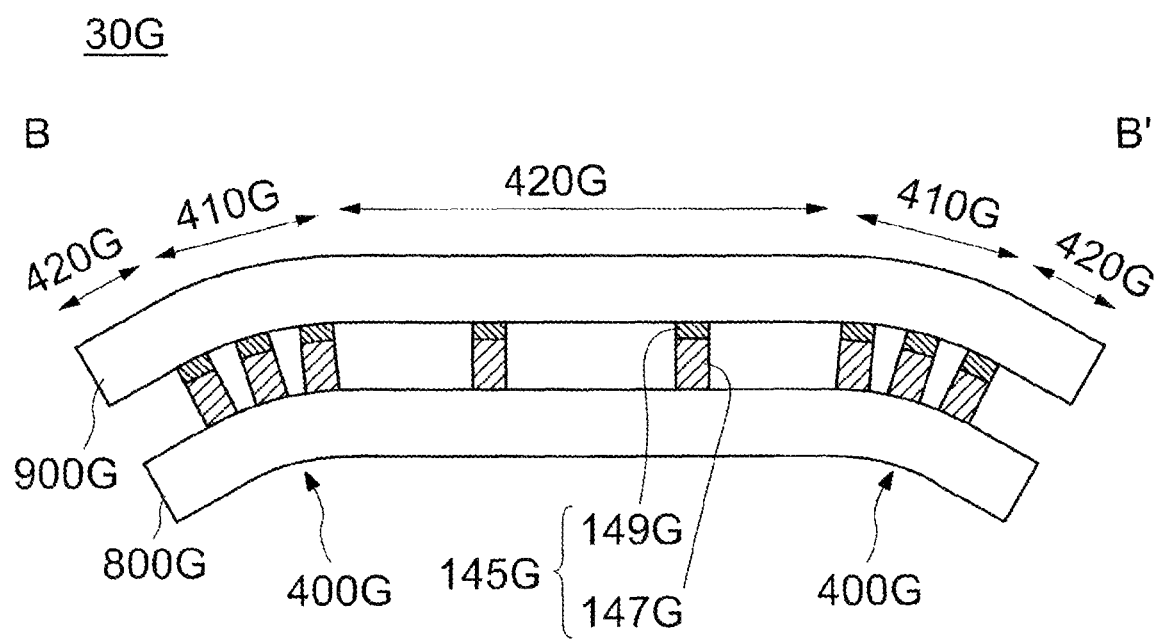
FIG. 13 is a cross-sectional view of the liquid crystal display device in an embodiment according to the present invention, taken along line B-B' in FIG. 12.

With reference to FIG. 12 and FIG. 13, an overview of a liquid crystal display device in an embodiment according to the present invention will be described. In embodiment 6, the layout of spacers 145G in a flexible liquid crystal display device 30G will be described. FIG. 12 is a plan view showing the layout of the spacers 145G in the liquid crystal display device 30G in embodiment 6, and FIG. 13 is a cross-sectional view taken along line B-B' in FIG. 12. The following description will be given with reference to FIG. 12 and FIG. 13.

As shown in FIG. 12 and FIG. 13, the liquid crystal display device 30G is flexible. A first substrate 800G and a second substrate 900G are bent at bonding portions 400G. As shown in FIG. 12, regions in the vicinity of the bending portions 400G are referred to as "first regions 410G". Regions far from the bending portions 400G, namely, regions where the first substrate 800G and the second substrate 900G are flat or have a radius of curvature larger than that of the bending portions 400G, are referred to as "second regions 420G". The spacers 145G are located at a higher density in the first regions 410G than in the second regions 420G. In other words, the locating density of polymer portions 149G of the spacers 145G is higher in the first regions 410G than in the second regions 420G.

As described above, in the liquid crystal display device 30G in embodiment 6, the spacers 145G are located at a higher density in the bending portions 400G, where the distance between the first substrate 800G and the second substrate 900G is easily changed and the first substrate 800G and the second substrate 900G are easily shifted in a planar direction, than in another region. In this manner, the distance between the first substrate 800G and the second substrate 900G is suppressed from being changed, and the first substrate 800G and the second substrate 900G are suppressed from being shifted in a planar direction.

The present invention is not limited to any of the above-described embodiments. The above embodiments may be modified appropriately without departing from the gist of the present invention.

What is claimed is:

1. A liquid crystal display device, comprising:
a first substrate;
a second substrate facing the first substrate;
a liquid crystal layer between the first substrate and the second substrate, the liquid crystal layer being enclosed by a sealing member;
a first protrusion in one of the first substrate and the second substrate in a region inner to the sealing member, the first protrusion protruding toward the other of the first substrate and the second substrate; and
a resin component bonding the other of the first substrate and the second substrate and the first protrusion to each other,
wherein the second substrate includes a first light-blocking layer having an opening provided therein,
the first substrate includes a pixel electrode, a switching element, and a second light-blocking layer,
the switching element is electrically connected with the pixel electrode,
the second light-blocking layer is between the switching element and the liquid crystal layer, and
the opening overlaps the first protrusion and the second light-blocking layer in a plan view.

2. The liquid crystal display device according to claim 1, wherein:
the resin component is an ultraviolet-curable polymer based on an ultraviolet-curable monomer; and
the second substrate has a transmittance for ultraviolet light higher than a transmittance of the first substrate for the ultraviolet light.

3. The liquid crystal display device according to claim 1, wherein the first substrate and the second substrate are flexible.

4. The liquid crystal display device according to claim 3, wherein:
the first substrate and the second substrate are bent at a bending portion, and include a first region in the vicinity of the bending portion in a plan view and a second region farther from the bending portion than the first region in a plan view; and
a plurality of the resin components are located at a higher locating density in the first region than in the second region.

5. The liquid crystal display device according to claim 1, further comprising a second protrusion in the first substrate, the second protrusion protruding toward the second substrate and being in contact with the second substrate.

6. The liquid crystal display device according to claim 5, further comprising a third protrusion in the first substrate, the third protrusion protruding toward the second substrate, wherein:
the liquid crystal layer is between the second substrate and the third protrusion; and
the second protrusion is greater than the third protrusion in the length from the first substrate.

7. The liquid crystal display device according to claim 5, wherein the first protrusion and the second protrusion have different area sizes from each other in a plan view.

8. The liquid crystal display device according to claim 5, wherein the first protrusion has an area size larger than an area size of the second protrusion in a plan view.

9. The liquid crystal display device according to claim 1, wherein the resin component is formed of a material different from a material of the first protrusion.

10. The liquid crystal display device according to claim 9, wherein the first substrate and the second substrate are flexible.

11. The liquid crystal display device according to claim 10, wherein:
the first substrate and the second substrate are bent at a bending portion, and include a first region in the vicinity of the bending portion in a plan view and a second region farther from the bending portion than the first region in a plan view; and
a plurality of the resin components are located at a higher locating density in the first region than in the second region.

12. The liquid crystal display device according to claim 10, further comprising a second protrusion in the first substrate, the second protrusion protruding toward the second substrate and being in contact with the second substrate.

13. The liquid crystal display device according to claim 12, further comprising a third protrusion in the first substrate, the third protrusion protruding toward the second substrate,
wherein:
the liquid crystal layer is between the second substrate and the third protrusion; and
the second protrusion is greater than the third protrusion in the length from the first substrate.

14. The liquid crystal display device according to claim 13, wherein the first protrusion has an area size larger than an area size of the second protrusion in a plan view.

* * * * *